United States Patent
Sun et al.

(10) Patent No.: US 11,182,024 B2
(45) Date of Patent: Nov. 23, 2021

(54) TOUCH SUBSTRATE, DRIVING METHOD, MANUFACTURING METHOD, TOUCH ASSEMBLY AND TOUCH DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Shumeng Sun, Beijing (CN); Xiaohu Li, Beijing (CN); Minghui Zhang, Beijing (CN); Inho Park, Beijing (CN); Xiaopeng Cui, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 63 days.

(21) Appl. No.: 16/649,343

(22) PCT Filed: Mar. 13, 2019

(86) PCT No.: PCT/CN2019/078012
§ 371 (c)(1),
(2) Date: Mar. 20, 2020

(87) PCT Pub. No.: WO2020/181532
PCT Pub. Date: Sep. 17, 2020

(65) Prior Publication Data
US 2021/0223905 A1   Jul. 22, 2021

(51) Int. Cl.
G06F 3/042   (2006.01)
G06F 3/041   (2006.01)
(Continued)

(52) U.S. Cl.
CPC .......... *G06F 3/0421* (2013.01); *G06F 3/0412* (2013.01); *G06F 3/0446* (2019.05);
(Continued)

(58) Field of Classification Search
CPC ..... G02B 3/14; G06F 3/0421; G06F 3/04186; G06F 3/0412; G06F 3/0446; G06F 3/04164; G06F 2203/04103
See application file for complete search history.

(56) References Cited

U.S. PATENT DOCUMENTS 8,564,567 B2 * 10/2013 Lee ................. G06F 3/0412
                                                345/175
9,292,126 B2 *  3/2016 Koito ............. G06F 3/04166
(Continued)

*Primary Examiner* — Bryan Earles
(74) *Attorney, Agent, or Firm* — Brooks Kushman P.C.

(57) ABSTRACT

A touch substrate includes an optical sensor structure, a parallel light detection structure and a lens positioning structure laminated one on another. The optical sensor structure is configured to determine plane position coordinates of the floating touch point in a direction parallel to the touch substrate based on a light flux received by each opening sensor unit. The lens positioning structure is configured to adjust a focal length of a target lens unit having the plane position coordinates in a plurality of lens units, so as to enable the light flux received by the optical sensor unit corresponding to the target lens unit to reach a threshold, thereby to determine a target focal length acquired when the light flux received by the optical sensor unit reaches the threshold as a space position coordinate of the floating touch point in a normal direction of the touch substrate.

17 Claims, 5 Drawing Sheets

(51) Int. Cl.
*G06F 3/044* (2006.01)
*G02B 3/14* (2006.01)

(52) U.S. Cl.
CPC ...... *G06F 3/04164* (2019.05); *G06F 3/04186* (2019.05); *G06F 2203/04103* (2013.01)

(56) References Cited

U.S. PATENT DOCUMENTS

| | | | | |
|---|---|---|---|---|
| 9,530,381 | B1 * | 12/2016 | Bozarth | H05B 47/00 |
| 10,078,977 | B2 * | 9/2018 | Atkinson | G09G 3/18 |
| 10,866,648 | B2 * | 12/2020 | Wang | G06F 3/042 |
| 10,949,642 | B2 * | 3/2021 | Bawolek | G02F 1/167 |

* cited by examiner

TOUCH SUBSTRATE, DRIVING METHOD, MANUFACTURING METHOD, TOUCH ASSEMBLY AND TOUCH DISPLAY DEVICE

CROSS-REFERENCE TO RELATED APPLICATION

This application is the U.S. national phase of PCT Application No. PCT/CN2019/078012 filed on Mar. 13, 2019, which is incorporated herein by reference in its entirety.

TECHNICAL FIELD

The present disclosure relates to the field of a touch technology, and specially to a touch substrate, a driving method, a manufacturing method, a touch assembly and a touch display device.

BACKGROUND

Along with the continuous development of the touch display technology, touch display devices have been widely applied to our lives. Currently, in use, an image displayed by the touch display device is touched by a finger of an operator, and then a touch position is detected by the touch display device, so as to control the display image, thereby to achieve a touch display function. However, it is merely able for the existing touch display device to perform a contact-type planar touch operation through determining two-dimensional (2D) coordinates of a touch point on a plane parallel to a touch display panel when the touch display panel is touched by the finger. When the touch point is generated by the operator in a three-dimensional (3D) space, it is impossible to determine coordinates of the touch panel in the 3D space, i.e., it is impossible to achieve a 3D touch function. Hence, there is an urgent need to provide a scheme for determining the coordinates of the touch point in the 3D space so as to achieve the 3D touch function.

SUMMARY

An object of the present disclosure is to provide a touch substrate, a driving method, a manufacturing method, a touch assembly, and a touch display device, so as to determine the coordinates of the touch point in the 3D space, thereby to achieve the 3D touch function.

In one aspect, the present disclosure provides in some embodiments a touch substrate, including: an optical sensor structure including a plurality of optical sensor units arranged in an array form and each configured to receive a target light beam having a specific wavelength and convert the received target light beam into an electric signal; a lens positioning structure laminated on the optical sensor structure and including a plurality of lens units each with a variable focal length, the lens units being arranged in an array form and corresponding to the optical sensor units in a one-to-one manner, an orthogonal projection of each lens unit onto the optical sensor structure at least partially overlapping the corresponding optical sensor unit; and a parallel light detection structure arranged between the optical sensor structure and the lens positioning structure and including a plurality of parallel light detection units, the parallel light detection units being arranged in an array form and corresponding to the optical sensor units in a one-to-one manner, an orthogonal projection of each parallel light detection unit onto the optical sensor structure overlapping the corresponding optical sensor unit, and each parallel light detection unit being configured in such a manner as to enable a light flux of parallel light beams exiting from the lens positioning structure to be greater than a light flux of non-parallel light beams exiting from the lens positioning structure.

In a possible embodiment of the present disclosure, the parallel light detection structure includes a body and a plurality of slits penetrating through the body in a normal direction of the touch substrate.

In a possible embodiment of the present disclosure, the lens positioning structure includes: a first substrate and a second substrate arranged opposite to each other; a plurality of barrier patterns arranged between the first substrate and the second substrate and configured to define a plurality of sealing cavities between the first substrate and the second substrate; a first transparent insulating liquid and a transparent elastic sphere arranged in each sealing cavity, the transparent elastic sphere including a transparent thin film, and a second transparent insulating liquid, positively-charged particles and negatively-charged particles encapsulated by the transparent thin film, a refractive index of the first transparent insulating liquid being smaller than a refractive index of the transparent elastic sphere; and a first electrode pattern and a second electrode pattern arranged within each sealing cavity and opposite to each other, the transparent elastic sphere being located between the first electrode pattern and the second electrode pattern, and the electric signals being applied to the first electrode pattern and the second electrode pattern so as to enable the transparent elastic sphere in each sealing cavity to be deformed, thereby to change the focal length of the lens unit formed by the transparent elastic sphere.

In a possible embodiment of the present disclosure, the lens positioning structure further includes a circuit control layer arranged between the first substrate and the second substrate and including a plurality of first scanning lines, a plurality of groups of data lines, and a plurality of control units. The plurality of control units corresponds to the plurality of sealing cavities in a one-to-one manner, and each control unit is connected to the first electrode pattern and the second electrode pattern in the corresponding sealing cavity. The plurality of control units is arranged in rows and columns, the plurality of first scanning lines corresponds to the rows of control units in a one-to-one manner, and each first scanning line is connected to the control units in the corresponding row. The plurality of groups of data lines corresponds to the columns of the control units in a one-to-one manner, each group of data lines include a first data line and a second data line insulated from each other, the first data line is connected to the control units in the corresponding column, and the second data line is connected to the control units in the corresponding column. Each control unit is configured to, under the control of the corresponding first scanning line, control the corresponding first data line to be electrically connected to, or electrically disconnected from, the corresponding first electrode pattern, and control the corresponding second data line to be electrically connected to, or electrically disconnected from, the corresponding second electrode pattern.

In a possible embodiment of the present disclosure, the lens positioning structure further includes a light-shielding pattern arranged between the first substrate and the second substrate and provided with a plurality of openings corresponding to the plurality of optical sensor units in a one-to-one manner. An orthogonal projection of each opening onto the optical sensor structure coincides with the corresponding optical sensor unit.

In a possible embodiment of the present disclosure, the optical sensor structure further includes a processing unit, a plurality of second scanning lines and a plurality of light flux signal transmission lines. The processing unit is connected to the plurality of second scanning lines and the plurality of light flux signal transmission lines, and configured to input a scanning signal to the plurality of second scanning lines, and determine plane position coordinates of a floating touch point in a direction parallel to the touch substrate based on light flux signals received via the plurality of light flux signal transmission lines. The plurality of optical sensor units is arranged in rows and columns, the plurality of second scanning lines corresponds to the rows of optical sensor units in a one-to-one manner, each second scanning line is connected to the optical sensor units in a corresponding row, the plurality of light flux signal transmission lines corresponds to the columns of optical sensor units in a one-to-one manner, and each light flux signal transmission line is connected to the optical sensor units in a corresponding column. Each optical sensor unit is configured to be enabled under the control of the corresponding second scanning line, and transmit the received light flux in the form of a signal to the processing unit via the corresponding light flux signal transmission line.

In another aspect, the present disclosure provides in some embodiments a touch assembly, including the above-mentioned touch substrate, and a floating touch member configured to emit a target light beam having a specific wavelength, and generate a floating touch point at a side of the lens positioning structure away from the optical sensor structure.

In yet another aspect, the present disclosure provides in some embodiments a touch display device including the above-mentioned touch assembly, and a display substrate laminated on the touch substrate.

In still yet another aspect, the present disclosure provides in some embodiments a driving method for the above-mentioned touch substrate, including: controlling, by an optical sensor structure, a plurality of optical sensor units of the optical sensor structure to be enabled, and determining plane position coordinates of a floating touch point in a direction parallel to the touch substrate based on a light flux received by each optical sensor unit; and adjusting, by a lens positioning structure, a focal length of a target lens unit having the plane position coordinates in a plurality of lens units of the lens positioning structure to enable the light flux received by the optical sensor unit corresponding to the target lens unit to reach a threshold, and determining a target focal length acquired when the light flux received by the optical sensor unit reaches the threshold as a space position coordinate of the floating touch point in a normal direction of the touch substrate. When a light beam reaching the optical sensor unit is parallel to the normal direction of the touch substrate, the light flux received by the optical sensor unit corresponding to the target lens unit reaches the threshold.

In a possible embodiment of the present disclosure, when the lens positioning structure includes a circuit control layer arranged between a first substrate and a second substrate, the adjusting, by the lens positioning structure, the focal length of the target lens unit having the plane position coordinates in the plurality of lens units of the lens positioning structure to enable the light flux received by the optical sensor unit corresponding to the target lens unit to reach the threshold includes: enabling, by a control unit corresponding to the target lens unit, a first data line corresponding to the target lens unit to be electrically connected to a corresponding first electrode pattern under the control of a first scanning line, and applying a positive electric signal to the corresponding first electrode pattern through the first data line; enabling, by the control unit corresponding to the target lens unit, a second data line corresponding to the target lens unit to be electrically connected to a second electrode pattern under the control of the corresponding first scanning line, and applying a negative electric signal to the corresponding second electrode pattern through the second data line, so as to generate a controllable electric field between the first electrode pattern and the second electrode pattern corresponding to the target lens unit; and controlling a transparent elastic sphere corresponding to the target lens unit to be deformed under the control of the controllable electric field, so as to change the focal length of the target lens unit formed by the transparent elastic sphere, thereby to enable the light flux received by the optical sensor unit corresponding to the target lens unit to reach the threshold.

In a possible embodiment of the present disclosure, when the optical sensor structure further includes a processing unit, a plurality of second scanning lines and a plurality of light flux signal transmission lines, the controlling, by the optical sensor structure, the plurality of optical sensor units of the optical sensor structure to be enabled and determining the plane position coordinates of the floating touch point in the direction parallel to the touch substrate based on the light flux received by each optical sensor unit includes: inputting, by the processing unit, a scanning signal to the plurality of second scanning lines one by one so as to enable the rows of optical sensor units to be enabled progressively, and transmitting, by each optical sensor unit, the received light flux in the form of an electric signal to the processing unit through the corresponding light flux signal transmission line when it has been enabled; and determining, by the processing unit, the plane position coordinates of the floating touch point in a direction parallel to the touch substrate based on the light flux signals received through the plurality of light flux signal transmission lines.

In still yet another aspect, the present disclosure provides in some embodiments a manufacturing method for the touch substrate, including: forming an optical sensor structure, the optical sensor structure including a plurality of optical sensor units arranged in an array form and each configured to receive a target light beam having a specific wavelength and convert the received target light beam into an electric signal; forming a parallel light detection structure on the optical sensor structure, the parallel light detection structure including a plurality of parallel light detection units, the parallel light detection units being arranged in an array form and corresponding to the optical sensor units in a one-to-one manner, an orthogonal projection of each parallel light detection unit onto the optical sensor structure overlapping the corresponding optical sensor unit, and each parallel light detection unit being configured in such a manner as to enable a light flux of parallel light beams exiting from a lens positioning structure to be greater than a light flux of non-parallel light beams exiting from the lens positioning structure; and forming the lens positioning structure at a side of the parallel light detection structure away from the optical sensor structure, the lens positioning structure including a plurality of lens units each with a variable focal length, the lens units being arranged in an array form and corresponding to the optical sensor units in a one-to-one manner, and an orthogonal projection of each lens unit onto the optical sensor structure at least partially overlapping the corresponding optical sensor unit.

In a possible embodiment of the present disclosure, the forming the parallel light detection structure includes: providing a body; and forming a plurality of slit groups corresponding to the optical sensor units in a one-to-one manner, each slit group including at least two slits, and each slit penetrating through the body in a normal direction of the touch substrate.

In a possible embodiment of the present disclosure, the forming the lens positioning structure includes: providing a first substrate and a second substrate; forming a plurality of barrier patterns on the first substrate, the plurality of barrier patterns being configured to define a plurality of accommodation cavities on the first substrate; forming a first electrode pattern and a second electrode pattern within each accommodation cavity, the first electrode pattern and the second electrode pattern being arranged opposite to each other; placing a transparent elastic sphere into each accommodation cavity, and filling each accommodation cavity with a first transparent insulating liquid, the transparent elastic sphere being arranged between the first electrode pattern and the second electrode pattern and including a transparent thin film, and a second transparent insulating liquid, positively-charged particles and negatively-charged particles encapsulated by the transparent thin film, and the first transparent insulating liquid having a refractive index smaller than the transparent elastic sphere; enabling the first substrate and the second substrate to be opposite to each other to form a cell, so as to enable each accommodation cavity on the first substrate to form a sealing cavity; and applying electric signals to the first electrode pattern and the second electrode pattern, so as to enable the transparent elastic sphere in the corresponding sealing cavity to be deformed, thereby to change a focal length of a lens unit formed by the transparent elastic sphere.

In a possible embodiment of the present disclosure, the forming the lens positioning structure further includes, prior to forming the plurality of barrier patterns, forming a circuit control layer on the first substrate. The circuit control layer includes a plurality of first scanning lines, a plurality of groups of data lines, and a plurality of control units. The plurality of control units corresponds to the plurality of sealing cavities in a one-to-one manner, and each control unit is connected to the first electrode pattern and the second electrode pattern in the corresponding sealing cavity. The plurality of control units is arranged in rows and columns, the plurality of first scanning lines corresponds to the rows of control units in a one-to-one manner, and each first scanning line is connected to the control units in the corresponding row. The plurality of groups of data lines corresponds to the columns of the control units in a one-to-one manner, each group of data lines include a first data line and a second data line insulated from each other, the first data line is connected to the control units in the corresponding column, and the second data line is connected to the control units in the corresponding column. Each control unit is configured to, under the control of the corresponding first scanning line, control the corresponding first data line to be electrically connected to, or electrically disconnected from, the corresponding first electrode pattern, and control the corresponding second data line to be electrically connected to, or electrically disconnected from, the corresponding second electrode pattern.

In a possible embodiment of the present disclosure, the forming the lens positioning structure further includes, prior to enabling the second substrate and the first substrate to be opposite to each other to form a cell, forming a light-shielding pattern on the second substrate, the light-shielding pattern being provided with a plurality of openings corresponding to the plurality of optical sensor units in a one-to-one manner. Subsequent to enabling the second substrate and the first substrate to be opposite to each other to form a cell, the light-shielding pattern is arranged between the first substrate and the second substrate, and an orthogonal projection of each opening onto the optical sensor structure coincides with the corresponding optical sensor unit.

In a possible embodiment of the present disclosure, the forming the optical sensor structure includes: providing a substrate; forming a plurality of second scanning lines and a plurality of light flux signal transmission lines on the substrate, the plurality of optical sensor units being arranged in rows and columns, the plurality of second scanning lines corresponding to the rows of optical sensor units in a one-to-one manner, each second scanning line being connected to the optical sensor units in the corresponding row, the plurality of light flux signal transmission lines corresponding to the columns of the optical sensor units in a one-to-one manner, and each light flux signal transmission line being connected to the optical sensor units in the corresponding column; and forming a processing unit at a peripheral region of the substrate, the processing unit being connected to the plurality of second scanning lines and the plurality of light flux signal transmission lines. Each optical sensor unit is configured to be enabled under the control of the corresponding second scanning line, and transmit the received light flux in the form of a signal to the processing unit via the corresponding light flux signal transmission line. The processing unit is configured to input a scanning signal to the plurality of second scanning lines, and determine plane position coordinates of a floating touch point in a direction parallel to the touch substrate based on light flux signals received via the plurality of light flux signal transmission lines.

According to the embodiments of the present disclosure, the touch substrate may include the optical sensor structure, the parallel light detection structure and the lens positioning structure laminated one on another. The optical sensor structure may include the optical sensor units corresponding to the parallel light detection units of the parallel light detection structure in a one-to-one mannerand corresponding to the lens units each with a variable focal length of the lens position structure in a one-to-one manner. When the floating touch point is generated at a side of the lens positioning structure away from the optical sensor structure, the optical sensor structure may determine the plane position coordinates of the floating touch point in the direction parallel to the touch substrate based on the light flux received by each optical sensor unit. After the determination of the plane position coordinates of the floating touch point, the lens position structure may adjust the focal length of the target lens unit having the plane position coordinates in the plurality of lens units, so as to enable the floating touch point to coincide with a focus of target lens unit, thereby to enable the light flux received by the optical sensor unit corresponding to the target lens unit to reach the threshold. Then, the space position coordinate of the floating touch pint in the normal direction of the touch substrate may be determined to be the target focal length acquired when the light flux received by the optical sensor unit reaches the threshold. In other words, the optical sensor structure may determine the plane position coordinates of the floating touch point in the direction parallel to the touch substrate, and then the floating touch point may be adjusted to the focus of the target lens unit having the plane position coordinates, so as to determine the space position coordinate of the floating touch point in the normal direction of the touch substrate. As a result, it is able to determine the coordinates of the floating touch point in a 3D space, thereby to achieve a 3D touch function.

In addition, the parallel light detection structure may be arranged between the optical sensor structure and the lens positioning structure, and the orthogonal projection of each parallel light detection unit of the parallel light detection structure onto the optical sensor structure may overlap the corresponding optical sensor unit, so a target light beam from the lens positioning structure needs to pass through the parallel light detection unit and then reach the corresponding optical sensor unit. Moreover, each parallel light detection unit is configured in such a manner as to enable the light flux of the parallel light beams from the lens positioning structure to be greater than the light flux of the non-parallel light beams from the lens positioning structure, so during the adjustment of the focal length of the target lens unit to adjust the floating touch point to the focus of the target lens unit, it is able to transmit the parallel light beams to the optical sensor unit through the corresponding parallel light detection unit in a better manner, and limit the transmission of the non-parallel light beams to the corresponding optical sensor unit to some extent. When the space position coordinate of the floating touch point is determined through adjusting the focal length of the target lens unit, the light beams received by the corresponding optical sensor unit are substantially parallel light beams, so as to prevent the non-parallel light beams transmitted to the optical sensor unit from interfering with the measurement of the light flux. When the light flux received by the optical sensor unit corresponding to the target lens unit reaches the threshold, it is able to determine that the target light beams from the target lens unit are all parallel light beams, i.e., the floating touch point is located at the focus of the target lens unit. As a result, it is able to accurately determine whether the floating touch point is at the focus of the target lens unit, thereby to accurately determine the space position coordinate of the floating touch point.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

The present disclosure will be described hereinafter in conjunction with the drawings and embodiments.

Figure 1:
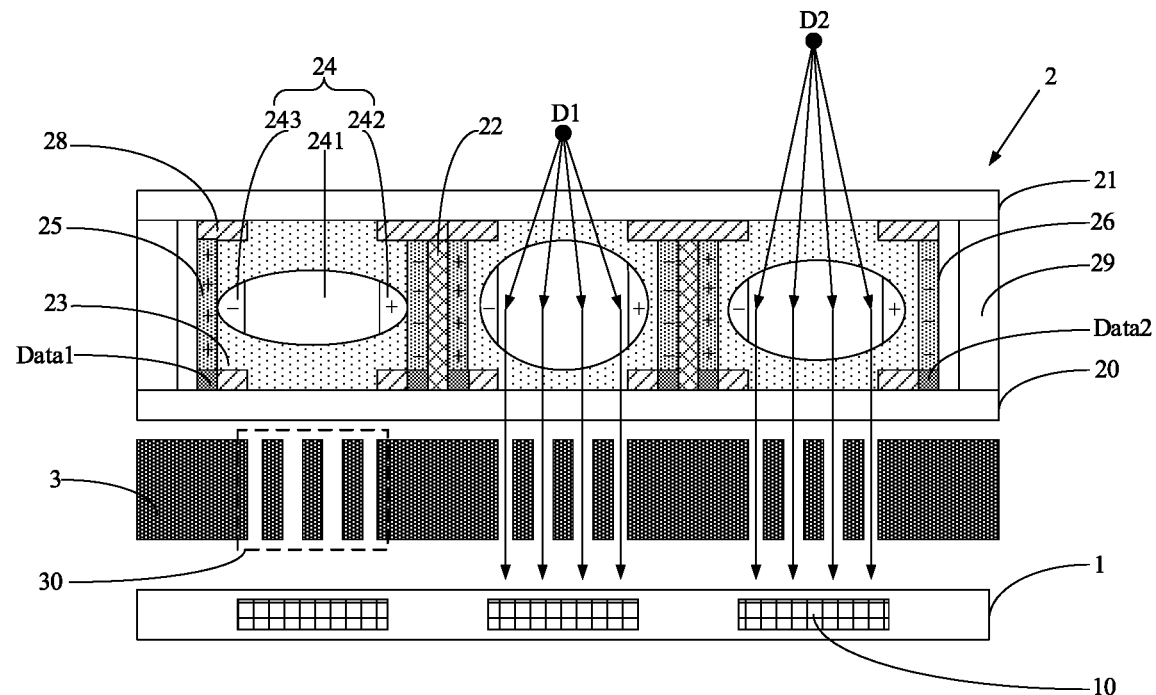
FIG. 1 is a sectional view of a touch substrate according to one embodiment of the present disclosure.

As shown in FIG. 1, the present disclosure provides in some embodiments a touch substrate, which includes an optical sensor structure 1, a lens positioning structure 2 and a parallel light detection structure 3. The optical sensor structure 1 may include a plurality of optical sensor units 10 arranged in an array form and each configured to receive a target light beam having a specific wavelength and convert the received target light beam into an electric signal. The optical sensor structure 1 is configured to determine plane position coordinates of a floating touch point in a direction parallel to the touch substrate based on a light flux received by each optical sensor unit, and the floating touch point (e.g., D1 and D2 in FIG. 1) may be located at a side of the lens positioning structure 2 away from the optical sensor structure 1 and capable of emitting the target light beam. The lens positioning structure 2 may be laminated on the optical sensor structure 1 and include a plurality of lens units each with a variable focal length. The lens units may be arranged in an array form and correspond to the optical sensor units 10 in a one-to one manner. An orthogonal projection of each lens unit onto the optical sensor structure 1 may at least partially overlap the corresponding optical sensor unit 10. The lens positioning structure 2 is configured to adjust a focal length of a target lens unit having the plane position coordinates in the plurality of lens units, so as to enable a light flux received by the optical sensor unit corresponding to the target lens unit to reach a threshold, and determine a target focal length acquired when the light flux received by the optical sensor unit 10 reaches the threshold as a space position coordinate of the floating touch point in a normal direction of the touch substrate. When the target light beam transmitted to the optical sensor unit 10 corresponding to the target lens unit is parallel to the normal direction of the touch substrate, the light flux received by the optical sensor unit 10 may reach the threshold. The parallel light detection structure 3 may be arranged between the optical sensor structure 1 and the lens positioning structure 2 and include a plurality of parallel light detection units 30. The parallel light detection units 30 may be arranged in an array form and correspond to the optical sensor units 10 in a one-to-one manner. An orthogonal projection of each parallel light detection unit 30 onto the optical sensor structure 1 may overlap the corresponding optical sensor unit 10, and each parallel light detection unit 30 is configured in such a manner as to enable a light flux of parallel light beams exiting the lens positioning structure 2 to be greater than a light flux of non-parallel light beams exiting the lens positioning structure 2.

To be specific, the optical sensor unit 10 may be of various types. Illustratively, it may be an infrared (IR) sensor unit, and the target light beam capable of being received by the IR sensor unit and having the specific wavelength may be an IR beam. In addition, the IR unit is capable of feeding back a size of the light flux of the received IR beam. When the IR beam is generated at the floating touch point, the light flux of the IR beam received by the IR sensor unit at a position corresponding to the floating touch point may be greater than the light flux of the IR beam received by the other IR sensor units. Hence, in actual use, the optical sensor structure 1 may detect the size of the light flux of the target light beam received by each optical sensor unit 10, determine the optical sensor unit 10 corresponding to the floating touch point, and then determine the plane position coordinates of the floating touch point based on plane position coordinates of the optical sensor unit 10 in the direction parallel to the touch substrate.

It should be appreciated that, the optical sensor unit 10 corresponding to the floating touch point may refer to an optical sensor unit 10 which overlaps an orthogonal projection of the floating touch point onto the touch substrate.

Further, the lens position structure 2 may include the lens units corresponding to the optical sensor units 10 in a one-to-one manner and each having a variable focal length, and the floating touch point may be located at a side of the lens positioning structure 2 away from the optical sensor structure 1, so the light beam from the floating touch point needs to pass through parts of the lens units of the lens positioning structure 2 and then reaches the corresponding optical sensor unit 10. In addition, the lens unit has a variable focal length, so the focal length of the lens unit may be adjusted so as to control an emergent direction of the target light beam passing through the lens unit. In this regard, the size of the light flux passing through the lens unit and reaching the optical sensor unit 10 corresponding to the lens unit may be adjusted based on a distance between the lens unit and the corresponding optical sensor unit 10. For example, the distance between the lens unit and the corresponding optical sensor unit 10 may be set as a target distance, and when the floating touch point is located at a focus of the target lens unit, the target light beam passing through the target lens unit toward the corresponding optical sensor unit 10 may be parallel to the normal direction of the touch substrate, and at this time the light flux received by the optical sensor unit 10 corresponding to the target lens unit may reach the threshold. It should be appreciated that, the threshold may be a maximum light flux received by the optical sensor unit 10 when the distance between the optical sensor unit 10 and the corresponding lens unit is the target distance.

It should be further appreciated that, when the orthogonal projection of the lens unit onto the optical sensor structure 1 at least partially overlaps the corresponding optical sensor unit 10, it may coincide with, or partially overlap, the corresponding optical sensor unit 10, and the lens unit and the corresponding optical sensor unit 10 may have same plane position coordinates.

In actual use, the floating touch point may be generated at a side of the lens positioning structure 2 away from the optical sensor structure 1, and the target light beam may be generated at the floating touch point and pass through the lens positioning structure 2 and the parallel light detection structure 3 toward the optical sensor structure 1. The optical sensor structure 1 may determine the plane position coordinates of the floating touch point in the direction parallel to the touch substrate based on the light flux of the target light beam received by each optical sensor unit 10. The lens positioning structure 2 may adjust the focal length of the target lens unit having the plane position coordinates in the plurality of lens units, so as to enable the floating touch point to be located at the focus of the target lens unit, and enable the light flux received by the optical sensor unit 10 corresponding to the target lens unit to reach the threshold, thereby to determine the target focal length acquired when the light flux received by the optical sensor unit 10 reaches the threshold as the space position coordinate of the floating touch point in the normal direction of the touch substrate. It should be appreciated that, the plane position coordinates may include an x-axis coordinate and a y-axis coordinate in a 2D coordinate system on a touch plane parallel to the touch substrate, and the space position coordinate may be a z-axis coordinate in a 3D coordinate system in the normal direction of the touch substrate.

Based on the structure of the touch substrate and the actual application thereof, the touch substrate may include the optical sensor structure 1 and the lens positioning structure 2 laminated one on another. The optical sensor structure 1 may include the optical sensor units 10 corresponding to the lens units each with a variable focal length of the lens position structure 2 in a one-to-one manner. When the floating touch point is generated at a side of the lens positioning structure 2 away from the optical sensor structure 1, the optical sensor structure 1 may determine the plane position coordinates of the floating touch point in the direction parallel to the touch substrate based on the light flux received by each optical sensor unit 10. After the determination of the plane position coordinates of the floating touch point, the lens position structure 2 may adjust the focal length of the target lens unit having the plane position coordinates in the plurality of lens units, so as to enable the floating touch point to coincide with a focus of target lens unit, thereby to enable the light flux received by the optical sensor unit 10 corresponding to the target lens unit to reach the threshold. Then, the target focal length acquired when the light flux received by the optical sensor unit 10 reaches the threshold is determined as the space position coordinate of the floating touch pint in the normal direction of the touch substrate. In other words, the optical sensor structure 1 may determine the plane position coordinates of the floating touch point in the direction parallel to the touch substrate, and then the floating touch point may be adjusted to the focus of the target lens unit having the plane position coordinates, so as to determine the space position coordinate of the floating touch point in the normal direction of the touch substrate. As a result, it is able to determine the coordinates of the floating touch point in a 3D space, thereby to achieve a 3D touch function.

In addition, the parallel light detection structure 3 may be arranged between the optical sensor structure 1 and the lens positioning structure 2 and include the parallel light detection units 30 corresponding to the optical sensor units 10 in a one-to-one manner, and the orthogonal projection of each parallel light detection unit 30 onto the optical sensor structure 1 may overlap the corresponding optical sensor unit 10, so the target light beam from the lens positioning structure 2 needs to pass through the parallel light detection unit 30 and then reach the corresponding optical sensor unit 10. Moreover, each parallel light detection unit 30 is configured in such a manner as to enable the light flux of the parallel light beams from the lens positioning structure 2 to be greater than the light flux of the non-parallel light beams from the lens positioning structure 2, so during the adjustment of the focal length of the target lens unit to adjust the floating touch point to the focus of the target lens unit, it is able to transmit the parallel light beams to the optical sensor unit 10 through the corresponding parallel light detection unit 30 in a better manner, and limit the transmission of the non-parallel light beams to the corresponding optical sensor unit 10 to some extent. When the space position coordinate of the floating touch point is determined through adjusting the focal length of the target lens unit, the light beams received by the corresponding optical sensor unit 10 are substantially parallel light beams, so as to prevent the non-parallel light beams transmitted to the optical sensor unit 10 from interfering with the measurement of the light flux. When the light flux received by the optical sensor unit 10 corresponding to the target lens unit reaches the threshold, it is able to determine that the target light beams from the target lens unit are all parallel light beams, i.e., the floating touch point is located at the focus of the target lens unit.

Hence, according to the touch substrate in the embodiments of the present disclosure, through providing the parallel light detection structure 3 between the optical sensor structure 1 and the lens positioning structure 2, it is able to accurately determine whether the floating touch point is at the focus of the target lens unit, thereby to accurately determine the space position coordinate of the floating touch point.

Further, the parallel light detection structure 3 may be of various structures. In a possible embodiment of the present disclosure, the parallel light detection structure 3 may include a body and a plurality of slits penetrating through the body in the normal direction of the touch substrate.

To be specific, the body may be made of various materials. For example, it may be made of a non-transparent resin material, e.g., a material commonly used for a black matrix of the display substrate. A ratio of an aperture size of each slit penetrating through the body in the normal direction of the touch substrate to a thickness of the body in the normal direction of the touch substrate shall be as small as possible. In a possible embodiment of the present disclosure, the ratio may be smaller than 1/1000. In addition, the aperture size of each slit may be at a nanometer level or a micrometer level.

During the manufacture of the parallel light detection structure 3, the body with a predetermined thickness may be formed at first, and then the slits penetrating the body may be formed in the normal direction of the touch substrate through etching, 3D printing, exposing or developing.

When the above structure is adopted by the parallel light detection structure 3, each parallel light detection unit 30 may include a plurality of slits, i.e., each parallel light detection unit 30 may be of a cellular structure and each slit in the cellular structure may be at a nanometer or micrometer level. In this regard, it is able to facilitate the transmission of the parallel light beams through the parallel light detection unit 30 and stop the non-parallel light beams from passing therethrough, thereby to accurately determine the space position coordinate of the floating touch point.

As shown in FIG. 1, in some embodiments of the present disclosure, the lens positioning structure 2 may include: a first substrate 20 and a second substrate 21 arranged opposite to each other; a plurality of barrier patterns 22 arranged between the first substrate 20 and the second substrate 21 and configured to define a plurality of sealing cavities between the first substrate 20 and the second substrate 21; a first transparent insulating liquid 23 and a transparent elastic sphere 24 arranged in each sealing cavity, the transparent elastic sphere 24 including a transparent thin film, and a second transparent insulating liquid 241, positively-charged particles 242 and negatively-charged particles 243 encapsulated by the transparent thin film, a refractive index of the first transparent insulating liquid 23 being smaller than a refractive index of the transparent elastic sphere 24; and a first electrode pattern 25 and a second electrode pattern 26 arranged within each sealing cavity and opposite to each other, the transparent elastic sphere 24 being located between the first electrode pattern 25 and the second electrode pattern 26, and the electric signals being applied to the first electrode pattern 25 and the second electrode pattern 26 so as to enable the transparent elastic sphere 24 in each sealing cavity to be deformed, thereby to change the focal length of the lens unit formed by the transparent elastic sphere 24.

To be specific, the plurality of barrier patterns 22 may be made of an insulating material, so as to enable the plurality of sealing cavities defined by the plurality of barrier patterns 22 to be insulated from each other, and prevent the electrodes or the transparent elastic spheres 24 in the adjacent cavities from being short-circuited, thereby to provide the lens positioning structure 2 with stable working performance.

The first transparent insulating liquid 23 may be a transparent dielectric material, e.g., pure water or nonpolar oil, e.g., silicone oil. The second transparent insulating liquid 241 may be a nonpolar liquid having a refractive index of 1 to 3, e.g., dimethicone, or an insulation medium for dispersing charged particles, e.g., nonpolar alkane, cycloalkane, arene, tetrachloroethylene or tetrachloromethane having a density similar to the charged particles, or a mixture of thereof in different ratios and having a similar density.

The positively-charged particles 242 and the negatively-charged particles 243 in the transparent elastic sphere 24 may be transparent or non-transparent. In a possible embodiment of the present disclosure, the positively-charged particles 242 and the negatively-charged particles 243 may be charged electrophoretic particles or electronic ink. The electrophoretic particle may be a charged particle acquired using a high-molecular polymer, e.g., polyvinyl benzene or polyethylene, as a host material, or a charged particle acquired using titanium dioxide as a host material. Currently, the charged electrophoretic particle has a minimum size of 50 nm to 100 nm and a maximum size of up to 50 μm, and the electronic ink particle has a minimum size of 1 μm to 2 μm. It should be appreciated that, the sizes of the positively-charged particles 242 and the negatively-charged particles 243 may be selected according to the practical need, and the quantities of the positively-charged particles 242 and the negatively-charged particles 243 in the transparent elastic sphere 24 may be set according to the practical need. When the positively-charged particles 242 and the negatively-charged particles 243 each has a relatively large size, the quantities of the positively-charged particles 242 and the negatively-charged particles 243 may be reduced correspondingly, and when the positively-charged particles 242 and the negatively-charged particles 243 each has a relatively small size, the quantities of the positively-charged particles 242 and the negatively-charged particles 243 may be increased correspondingly. In addition, the transparent elastic sphere 24 may also be directly formed as a large-size electrophoretic sphere or an electronic ink microcapsule, and a manufacture process thereof is similar to that known in the art.

In a possible embodiment of the present disclosure, the transparent thin film of the transparent elastic sphere 24 may be an organic transparent insulating thin film, e.g., a polyimide (PI) thin film, a polyester thin film or a polyolefin thin film, or an elastic transparent polymer thin film.

In a possible embodiment of the present disclosure, the first electrode pattern 25 and the second electrode pattern 26 may each be made of a transparent material (e.g., Indium Tin Oxide (ITO)), or a non-transparent metallic material, e.g., a conductive material which is capable of forming a film easily through sputtering (e.g., Cu or Ag). The transparent elastic sphere 24 may be arranged between the first electrode pattern 25 and the second electrode pattern 26, and the electric signals may be applied to the first electrode pattern 25 and the second electrode pattern 26, so as to enable the transparent elastic sphere 24 within the sealing cavity to be deformed, thereby to change the focal length of the lens unit formed by the transparent elastic sphere 24.

Figure 2:
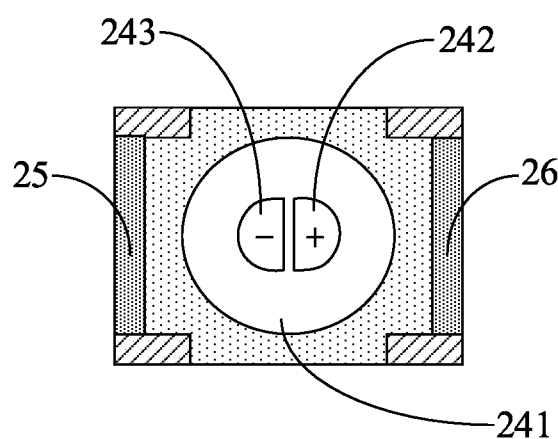
FIG. 2 is a schematic view showing a form of a transparent elastic sphere when no electric signal is applied according to one embodiment of the present disclosure.

More specifically, because the transparent elastic sphere 24 includes the transparent thin film, and the second transparent insulating liquid 241, the positively-charged particles 242 and the negatively-charged particles 243 encapsulated by the transparent thin film, there is mutual attraction between the positively-charged particle 242 and the negatively-charged particle 243. When no electric signal is applied to the first electrode pattern 25 and the second electrode pattern 26, as shown in FIG. 2, the positively-charged particles 242 may move close to the negatively-charged particles 243 due to the mutual attraction.

Figure 3:
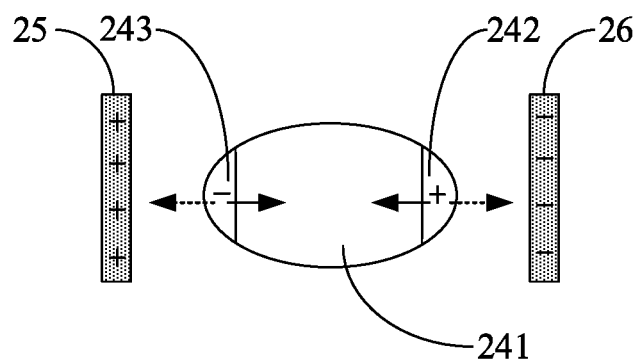
FIG. 3 is a schematic view showing forces applied to the transparent elastic sphere when an electric signal is applied according to one embodiment of the present disclosure.
Figure 4:
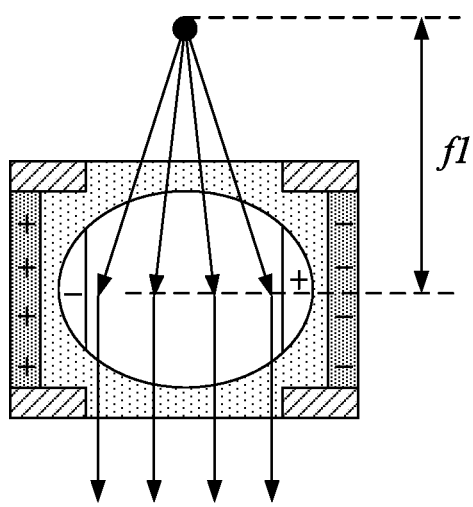
FIG. 4 is a schematic view showing the form of the transparent elastic sphere corresponding to a focal length f1 according to one embodiment of the present disclosure.
Figure 5:
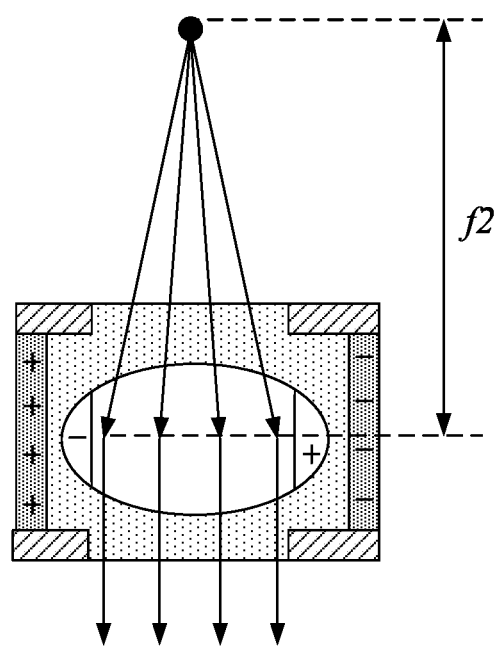
FIG. 5 is another schematic view showing the form of the transparent elastic sphere corresponding to a focal length f2 according to one embodiment of the present disclosure.

When the electric signals are applied to the electrode patterns, the first electrode pattern 25 and the second electrode pattern 26 may each attract or repel the positively-charged particles 242 and the negatively-charged particles 243, as shown in FIG. 3. In FIG. 3, a dotted line with an arrow represents an attractive force applied by the electrode to the particles, and a solid line with an arrow represents an attractive force between the positively-charged particle 242 and the negatively-charged particle 243. When the attractive force applied by the electrode to the particles is greater than the attractive force generated between the particles, the positively-charged particles 242 may move away from the negatively-charged particles 243, and when the attractive force applied by the electrode to the particles is smaller than the attractive force generated between the particles, the positively-charged particles 242 may move close to the negatively-charged particles 243. When electric signals with opposite polarities are applied to the first electrode pattern 25 and the second electrode pattern 26 respectively, an electric field may be generated between the first electrode pattern 25 and the second electrode pattern 26. Due to the effect of the electric field, the positively-charged particles 242 in the transparent elastic sphere 24 may move close to the electrode pattern where the negative electric signal is applied, and the negatively-charged particles 243 may move close to the electrode pattern to which the positive electric signal is applied, i.e., the positively-charged particles 242 and the negatively-charged particles 243 may move toward opposite ends, so as to enable the transparent elastic sphere 24 to be deformed, thereby to change a curvature of the transparent elastic sphere 24. At this time, the curvature of the lens unit formed by the transparent elastic sphere 24 may change too, so as to change the focal length of the target lens unit. As shown in FIGS. 4 and 5, a focal length f1 and a focal length f2 may be acquired.

An operating procedure of the touch substrate will be described hereinafter in more details.

Figure 6:
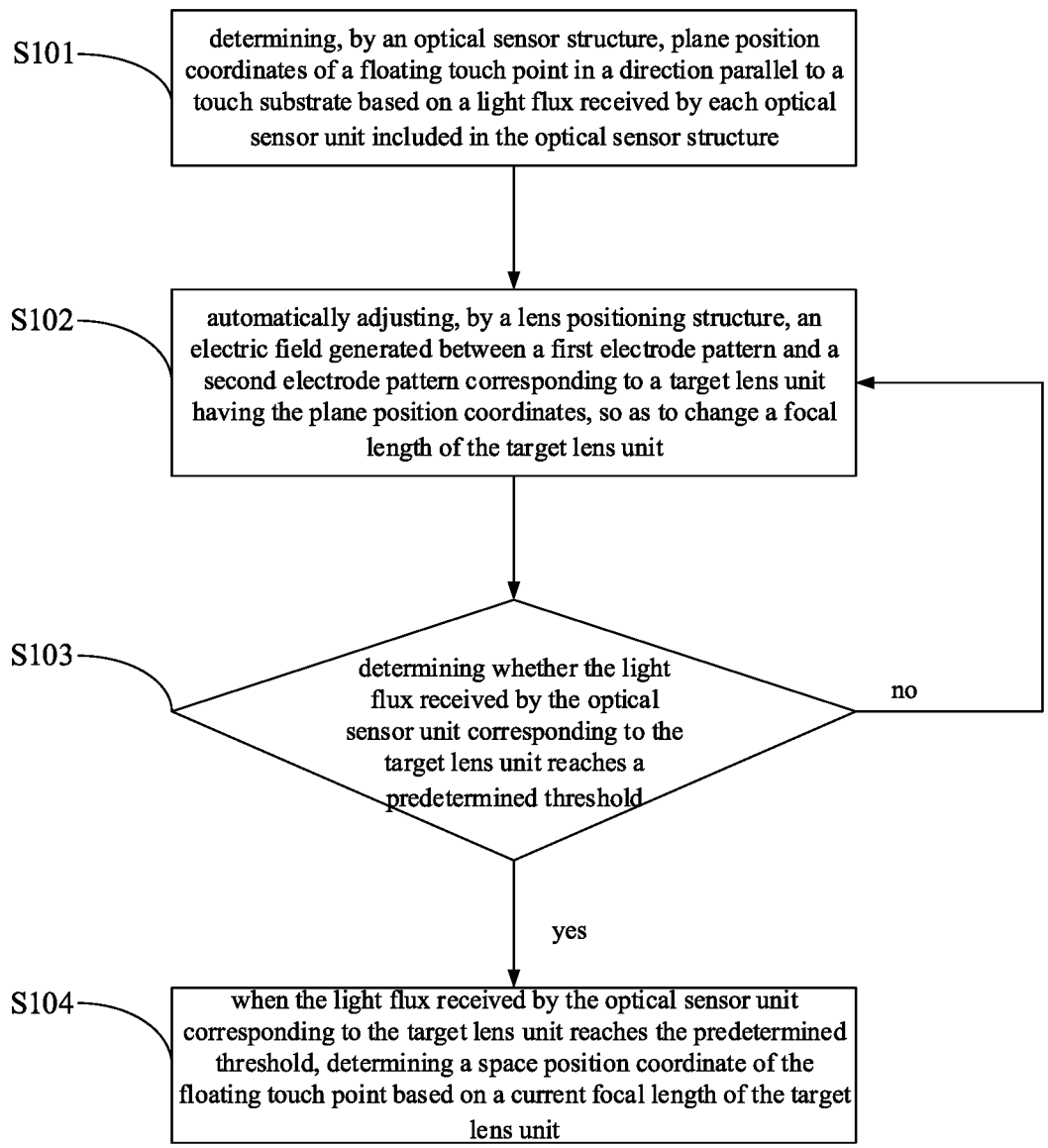
FIG. 6 is a flow chart of determining a floating touch point according to one embodiment of the present disclosure.

As shown in FIG. 6, taking a touch operation with a single, fixed gesture as an example, a floating touch point may be formed at a fixed position at a side of the touch substrate where the lens positioning structure 2 is located, and a procedure of determining the space position coordinate of the floating touch point at the fixed position may include the following steps.

Step S101: determining, by the optical sensor structure 1, the plane position coordinates of the floating touch point in the direction parallel to the touch substrate based on the light flux received by each optical sensor unit 10.

Step S102: automatically adjusting, by the lens positioning structure 2, the electric field generated between the first electrode pattern 25 and the second electrode pattern 26 corresponding to the target lens unit having the plane position coordinates, so as to change the focal length of the target lens unit.

Step S103: determining whether the light flux received by the optical sensor unit 10 corresponding to the target lens unit reaches a predetermined threshold, and when the light flux does not reach the predetermined threshold, returning to Step S102.

Step S104: when the light flux received by the optical sensor unit 10 corresponding to the target lens unit reaches the predetermined threshold, determining the space position coordinate of the floating touch point based on a current focal length of the target lens unit.

It should be appreciated that, the lens unit formed by the transparent elastic sphere 4 may be a convex lens, and an imaging rule for the convex lens may be expressed as the following equation:

$$\frac{1}{u} + \frac{1}{v} = \frac{1}{f}, \quad (1)$$

where u represents an object distance, v represents an image distance, and f represents the focal length of the lens. When $v \to \infty$, u=f, i.e., when the parallel light beams exit the lens unit, the object distance may be equal to the focal length, and at this time, the floating touch point may be at the focus of the lens unit.

In addition, the focal length f of the lens unit may meet the following equation:

$$f = \frac{n_0 r}{2(n - n_0)}, \quad (2)$$

where r represents a curvature radius of the lens, n represents a refractive index of the lens (i.e., the refractive index of the second transparent insulating liquid 241 in the transparent elastic sphere 24), and $n_0$ represents a refractive index of a medium (i.e., the refractive index of the first transparent insulating liquid 23).

In addition, there is the following correspondence between the curvature radius r of the lens and an electric field voltage U formed between the first electrode pattern 25 and the second electrode pattern 26:

$$r = f(U) \quad (3).$$

Figure 7:
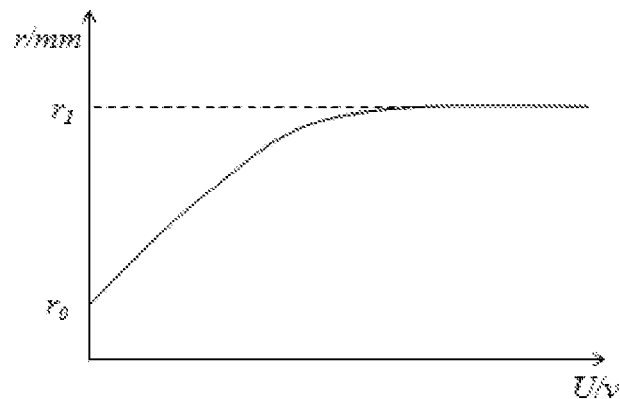
FIG. 7 is a curve diagram of a relationship between an electric field voltage and a curvature radius of a lens unit according to one embodiment of the present disclosure.

FIG. 7 shows the relationship between the curvature radius of the lens (mm) and the electric field voltage U (v), where $r_0$ represents an original curvature radius of the lens, and $r_1$ represents a critical curvature radius of the lens. A range of the curvature radius r of the lens may be $r_0 < r < r_1$, and correspondingly a range of the focal length of the lens may be $f_0 < f < f_1$, wherein $f_0$ corresponds to $r_0$, and $f_1$ corresponds to $r_1$. In addition, a range of the object distance may be $u_0 < u < u_1$, where $u_0$ corresponds to $r_0$, and $u_1$ corresponds to $r_1$.

Based on the above equations (1), (2) and (3), during the adjustment of the focal length of the target lens unit, sizes of the electric signals applied to the first electrode pattern 25 and the second electrode pattern 26 may be controlled, so as to control a size of the electric field voltage U generated between the first electrode pattern 25 and the second electrode pattern 26. Due to the above-mentioned correspondence between the electric field voltage U and the curvature radius r of the target lens unit expressed by the equation (3), it is able to adjust the curvature radius r of the target lens unit. In addition, due to the correspondence between the curvature radius r of the target lens unit and the focal length f of the target lens unit expressed by the equation (2), it is able to determine the focal length f of the target lens unit based on the curvature radius r of the target lens unit. When the light flux received by the optical sensor unit 10 reaches the threshold, i.e., when the target light beams received by the optical sensor unit 10 are parallel light beams, it is able to determine that the floating touch point is located at the focus of the target lens unit, i.e., the space position coordinate z of the floating touch point may meet z=u=f. Hence, when it is determined that z=u=f, it is able to determine the space position coordinate of the floating touch point through the equations (1), (2) and (3).

Figure 8:
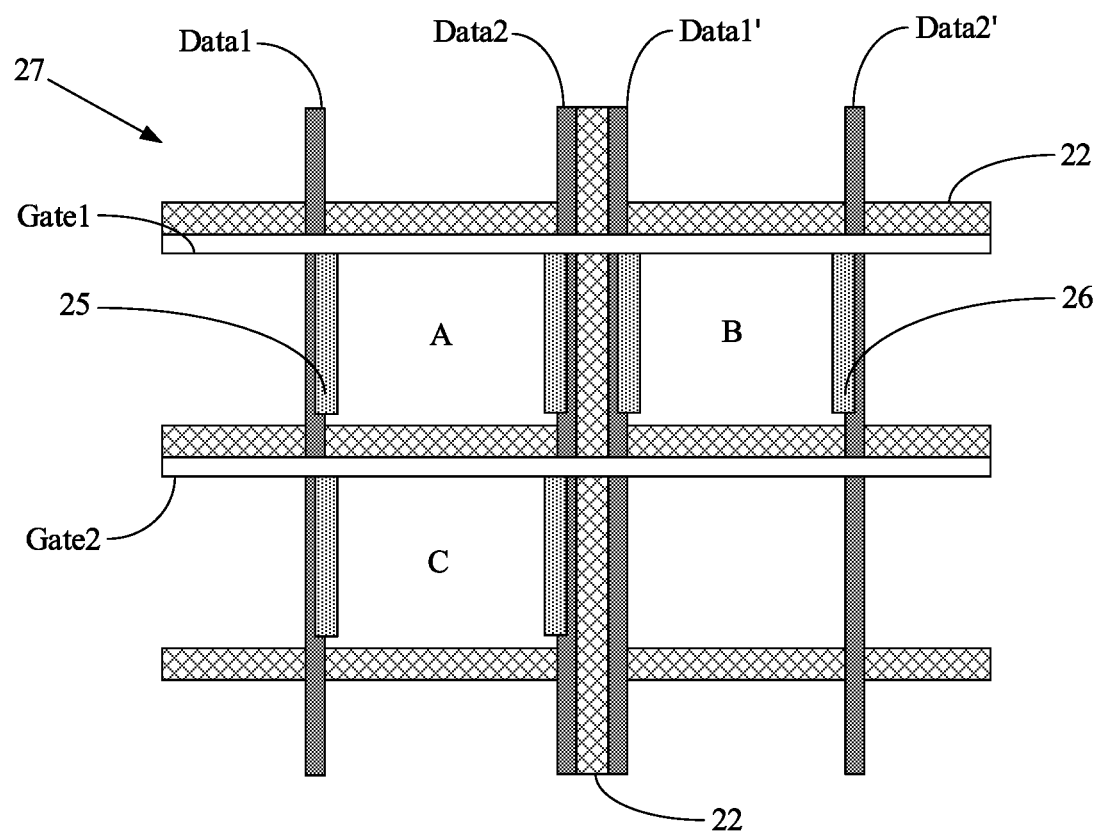
FIG. 8 is a schematic view showing a circuit control layer according to one embodiment of the present disclosure.

As shown in FIG. 8, the lens positioning structure 2 may further include a circuit control layer 27 arranged between the first substrate 20 and the second substrate 21 and including a plurality of first scanning lines Gate, a plurality of groups of data lines Data, and a plurality of control units. The plurality of control units may correspond to the plurality of sealing cavities in a one-to-one manner, and each control unit may be connected to the first electrode pattern 25 and the second electrode pattern 26 in the corresponding sealing cavity. The plurality of control units may be arranged in rows and columns, the plurality of first scanning lines Gate may correspond to the rows of control units in a one-to-one manner, and each first scanning line Gate may be connected to the control units in the corresponding row. The plurality of groups of data lines may correspond to the columns of the control units in a one-to-one manner, each group of data lines may include a first data line Data 1 (Data 1') and a second data line Data 2(Data 2') insulated from each other, the first data line Data 1 may be connected to the control units in the corresponding column, and the second data line Data 2 may be connected to the control units in the corresponding column. Each control unit is configured to, under the control of the corresponding first scanning line Gate, control the corresponding first data line Data 1 to be electrically connected to, or electrically disconnected from, the corresponding first electrode pattern 25, and control the corresponding second data line Data 2 to be electrically connected to, or electrically disconnected from, the corresponding second electrode pattern 26.

An operating procedure of the circuit control layer 27 will be described as follows.

After the determination of the plane position coordinates of the floating touch point, the target lens unit having the plane position coordinates may be determined. Then, under the control of the corresponding first scanning line Gate corresponding to the target lens unit, the control unit corresponding to the target lens unit may control the first data line Data 1 corresponding to the target lens unit to be electrically connected to the corresponding first electrode pattern 25, and the positive electric signal may be applied to the corresponding first electrode pattern 25 through the first data line Data 1. In addition, under the control of the first scanning line Gate corresponding to the target lens unit, the control unit corresponding to the target lens unit may control the second data line Data 2 corresponding to the target lens unit to be electrically connected to the corresponding second electrode pattern 26, and the negative electric signal may be applied to the corresponding second electrode pattern 26 through the second data line Data 2. At this time, a controllable electric field may be generated between the first electrode pattern 25 and the second electrode pattern 26 corresponding to the target lens unit. Under the effect of the controllable electric field, the transparent elastic sphere 24 corresponding to the target lens unit may be deformed, so as to change the focal length of the target lens unit formed by the transparent elastic sphere 24 and enable the floating touch point to coincide with the focus of the target lens unit, thereby to determine the space position coordinate of the floating touch point.

It should be appreciated that, when there is a plurality of determined target lens units, e.g., when there are a first target lens unit A, a second target lens unit B and a third target lens unit C as shown in FIG. 8, the operating procedure of the circuit control layer 27 will be described as follows. The first scanning lines Gate may be scanned progressively, and when Gate 1 is being scanned, a first control unit corresponding to the first target lens unit A may, under the control of Gate 1, control the first data line Data 1 corresponding to the first target lens unit A to be electrically connected to the first electrode pattern 25, and apply the positive electric signal to the corresponding first electrode pattern 25 through the first data line Data 1. In addition, the first control unit corresponding to the first target lens unit A may, under the control of Gate 1, control the second data line Data 2 corresponding to the first target lens unit A to be electrically connected to the second electrode pattern 26, and apply the negative electric signal to the corresponding second electrode pattern 26 through the second data line Data 2. At this time, the controllable electric field may be generated between the first electrode pattern 25 and the second electrode pattern 26 corresponding to the first target lens unit A, and a focal length of the first target lens unit A may be adjusted under the effect of the controllable electric field. A second control unit corresponding to the second target lens unit B may, under the control of Gate 1, control the first data line Data 1' corresponding to the second target lens unit B to be electrically connected to the first electrode pattern 25, and apply the positive electric signal to the corresponding first electrode pattern 25 through the first data line Data 1'. In addition, the second control unit corresponding to the second target lens unit B may, under the control of Gate 1, control the second data line Data 2' corresponding to the second target lens unit B to be electrically connected to the second electrode pattern 26, and apply the negative electric signal to the corresponding second electrode pattern 26 through the second data line Data 2'. At this time, the controllable electric field may be generated between the first electrode pattern 25 and the second electrode pattern 26 corresponding to the second target lens unit B, and a focal length of the second target lens unit B may be adjusted under the effect of the controllable electric field. When Gate 2 is being scanned, a third control unit corresponding to the third target lens unit C may, under the control of Gate 2, control the first data line Data 1 corresponding to the third target lens unit C to be electrically connected to the first electrode pattern 25, and apply the positive electric signal to the corresponding first electrode pattern 25 through the first data line Data 1. In addition, the third control unit corresponding to the third target lens unit C may, under the control of Gate 2, control the second data line Data 2 corresponding to the third target lens unit C to be electrically connected to the second electrode pattern 26, and apply the negative electric signal to the corresponding second electrode pattern 26 through the second data line Data 2. At this time, the controllable electric field may be generated between the first electrode pattern 25 and the second electrode pattern 26 corresponding to the third target lens unit C, and a focal length of the third target lens unit C may be adjusted under the effect of the controllable electric field.

Based on the structure of the circuit control layer 27 and an operating mode thereof, it is able for the circuit control layer 27 to separately adjust the focal length of any lens unit of the lens positioning structure 2.

More specifically, the circuit control layer 27 may be arranged between the substrate (the first substrate 20 or the second substrate 21) and the lens unit. In the circuit control layer 27, the first scanning lines Gate may cross, and may be insulated from, the data lines. The control unit of the circuit control layer 27 may be of various structures. For example, each control unit may include a first transistor and a second transistor. A gate electrode of the first transmission may be connected to the corresponding first scanning line Gate, a first electrode of the first transistor may be connected to a corresponding first data line Data 1, and a second electrode of the first transistor may be connected to the corresponding first electrode pattern 25. A gate electrode of the second transistor may be connected to a corresponding first scanning line Gate, a first electrode of the second transistor may be connected to a corresponding second data line Data 2, and a second electrode of the second transistor may be connected to the corresponding second electrode pattern 26. The first transistor and the second transistor may each function as a switching transistor, and under the control of the corresponding first scanning line Gate, the first electrode and the second electrode of each of the first transistor and the second transistor may be electrically connected to each other, so as to enable the first data line Data 1 to be electrically connected to the corresponding first electrode pattern 25 and enable the second data line Data 2 to be electrically connected to the corresponding second electrode pattern 26.

Referring to FIG. 1 again, in some embodiments of the present disclosure, the lens positioning structure 2 may further include a light-shielding pattern 28 arranged between the first substrate 20 and the second substrate 21 and provided with a plurality of openings corresponding to the plurality of optical sensor units 10 in a one-to-one manner. An orthogonal projection of each opening onto the optical sensor structure 1 may coincide with the corresponding optical sensor unit 10.

To be specific, the light-shielding pattern 28 may be made of a non-transparent resin material, e.g., a same material as the black matrix of the display substrate.

The light-shielding pattern 28 may be of various structures. For example, the light-shielding pattern 28 may include a first sub-pattern and/or a second sub-pattern. The first sub-pattern may be arranged at a surface of the first substrate 20 facing the second substrate 21 and provided with a plurality of openings corresponding to the optical sensor units in a one-to-one manner, and an orthogonal projection of each opening onto the optical sensor structure 1 may coincide with the corresponding optical sensor unit 10. The second sub-pattern may be arranged at a surface of the second substrate 21 facing the first substrate 20 and provided with a plurality of openings corresponding to the optical sensor units in a one-to-one manner, and an orthogonal projection of each opening onto the optical sensor structure 1 may coincide with the corresponding optical sensor unit 10.

When the lens positioning structure 2 includes the light-shielding pattern 28, the light-shielding pattern 28 may be used to not only shield the barrier patterns 22 between the first substrate 20 and the second substrate 21, the first electrode patterns 25, the second electrode patterns 26, the circuit control layer 27 and/or the positively-charged particles 242 and the negatively-charged particles 243 in the transparent elastic sphere 24, but also enable the target light beam generated at the floating touch point to pass through the opening in the light-shielding pattern 28 toward the lens unit, and/or enable the target light beam from the lens unit to pass through the opening in the light-shielding pattern 28 toward the corresponding optical sensor unit 10, thereby to ensure the stable working performance of the lens positioning structure 2.

In some embodiments of the present disclosure, the optical sensor structure 1 may further include a processing unit, a plurality of second scanning lines and a plurality of light flux signal transmission lines. The processing unit may be connected to the plurality of second scanning lines and the plurality of light flux signal transmission lines, and configured to input a scanning signal to the plurality of second scanning lines, and determine plane position coordinates of a floating touch point in a direction parallel to the touch substrate based on light flux signals received via the plurality of light flux signal transmission lines. The plurality of optical sensor units 10 may be arranged in rows and columns, the plurality of second scanning lines may correspond to the rows of optical sensor units 10 in a one-to-one manner, each second scanning line may be connected to the optical sensor units 10 in a corresponding row, the plurality of light flux signal transmission lines may correspond to the columns of optical sensor units 10 in a one-to-one manner, and each light flux signal transmission line may be connected to the optical sensor units in a corresponding column. Each optical sensor unit 10 is configured to be enabled under the control of the corresponding second scanning line, and transmit the received light flux in the form of a signal to the processing unit via the corresponding light flux signal transmission line.

An operating procedure of the optical sensor unit will be described hereinafter.

The processing unit may transmit the scanning signal to the plurality of second scanning lines one by one, so as to enable the rows of optical sensor units 10 progressively. Each optical sensor unit 10, after being enabled, may transmit the received light flux in the form of a signal to the processing unit via the corresponding light flux signal transmission line. The processing unit may determine the plane position coordinates of the floating touch point in the direction parallel to the touch substrate based on the light flux received through each light flux signal transmission signal. More specifically, because the light flux of the target light beam received by the optical sensor unit 10 corresponding to the floating touch point is greater than the light flux of the target light beam received by the other optical sensor units 10 when the target light beam is generated at the floating touch point, the processing unit may determine the optical sensor unit 10 corresponding to the floating touch point based on the size of the light flux received through each light flux signal transmission line. The plane position coordinates of each optical sensor unit 10 of the optical sensor structure may be set in advance, so it is able to determine the plane position coordinates of the floating touch point based on the plane position coordinates of the optical sensor unit 10 corresponding to the flowing touch point in the direction parallel to the touch substrate.

It should be appreciated that, the second scanning lines may cross, and may be insulated from, the light flux signal transmission lines, and the processing unit may be a driving IC.

When the optical sensor structure 1 includes the processing unit, the plurality of second scanning lines and the plurality of light flux signal transmission lines, the optical sensor structure 1 may accurately acquire the light flux received by each optical sensor unit 10 in a progressive manner and determine the optical sensor unit 10 corresponding to the floating touch point, thereby to acquire the plane position coordinates of the floating touch point.

The present disclosure further provides in some embodiments a touch assembly which includes the above-mentioned touch substrate, and a floating touch member configured to generate a target light beam having a specific wavelength and capable of generating a floating touch point at a side of the lens positioning structure away from the optical sensor structure 1.

In actual use, the floating touch member may generate the floating touch point at a side of the lens positioning structure 2 of the touch substrate away from the optical sensor structure 1, and generate the target light beam having the specific wavelength. The target light beam may pass through the lens positioning structure 2 toward the optical sensor structure 1. The optical sensor structure 1 may determine the plane position coordinates of the floating touch point in the direction parallel to the touch substrate based on the light flux of the target light beam received by each optical sensor unit 10. The lens positioning structure 2 may adjust the focal length of the target lens unit having the plane position coordinates in the plurality of lens units, so as to enable the floating touch point to be located at the focus of the target lens unit and enable the light flux received by the optical sensor unit corresponding to the target lens unit to reach the threshold, thereby to determine the target focal length acquired when the light flux received by the corresponding optical sensor unit 10 reaches the threshold as the space position coordinate of the floating touch point in the normal direction of the touch substrate.

It should be appreciated that, the floating touch member may be of various types, e.g., an electronic stylus or an electronic glove provided with a target light beam transmitter.

Based on the structure of the touch assembly and an application mode thereof, the floating touch member of the touch assembly may generate the floating touch point at a side of the lens positioning structure 2 away from the optical sensor structure 1, and generate the target light beam having the specific wavelength. The target light beam may pass through the lens positioning structure 2 of the touch substrate toward the optical sensor structure 1. The optical sensor structure 1 may determine the plane position coordinates of the floating touch point in the direction parallel to the touch substrate based on the received light flux of the target light beam, and then the floating touch point may be adjusted to be located at the focus of the target lens unit having the plane position coordinates, so as to determine the space position coordinate of the floating touch point in the normal direction of the touch substrate. Hence, it is able to determine the coordinates of the floating touch point in the 3D space, thereby to achieve the 3D touch function.

The present disclosure further provides in some embodiments a touch display device which includes the above-mentioned touch assembly and a display substrate laminated on the touch substrate.

To be specific, the touch substrate may be arranged at a side of the touch substrate where the optical sensor units 10 are located or where the lens positioning structure 2 is located. The display substrate may include a plurality of pixel units arranged in an array form and corresponding to the optical sensor units of the optical sensor structure 1 in a one-to-one manner.

In actual use, when the display substrate is arranged at a side of the touch substrate where the lens positioning structure 2 is located, after an image is displayed by the display substrate and an operation to be performed has been determined based on the displayed image, the floating touch member of the touch assembly may generate the floating touch point at a side of the display substrate away from the touch substrate, and generate the target light beam having the specific wavelength. The target light beam may pass through the display substrate and the lens positioning structure 2 of the touch substrate toward the optical sensor structure 1. The optical sensor structure 1 may determine the plane position coordinates of the floating touch point in the direction parallel to the touch substrate based on the received light flux of the target light beam, and then the floating touch point may be adjusted to be located at the focus of the target lens unit having the plane position coordinates, so as to determine the space position coordinate of the floating touch point in the normal direction of the touch substrate. Hence, it is able to determine the coordinates of the floating touch point in the 3D space, thereby to achieve the 3D touch function.

It should be appreciated that, the touch display device may be any product or member having a display function, e.g., television, display, digital photo frame, mobile phone or flat-panel computer. The touch display device may further include a flexible circuit board, a printed circuit board and a back plate.

The present disclosure further provides in some embodiments a driving method for the above-mentioned touch substrate, which includes: controlling, by the optical sensor structure 1, the plurality of optical sensor units 10 of the optical sensor structure to be enabled, and determining the plane position coordinates of the floating touch point in a direction parallel to the touch substrate based on the light flux received by each optical sensor unit 10; and adjusting, by the lens positioning structure 2, a focal length of the target lens unit having the plane position coordinates in the plurality of lens units of the lens positioning structure to enable the light flux received by the optical sensor unit 10 corresponding to the target lens unit to reach a threshold, and determining a target focal length acquired when the light flux received by the optical sensor unit reaches the threshold as the space position coordinate of the floating touch point in the normal direction of the touch substrate. When a light beam reaching the optical sensor unit 10 is parallel to the normal direction of the touch substrate, the light flux received by the optical sensor unit 10 corresponding to the target lens unit may reach the threshold.

To be specific, the floating touch point may be generated at a side of the lens positioning structure 2 away from the optical sensor structure 1, and the target light beam may be generated at the floating touch point and pass through the lens positioning structure 2 and the parallel light detection structure 3 toward at least a part of the optical sensor units of the optical sensor structure 1. The optical sensor structure 1 may determine the plane position coordinates of the floating touch point in the direction parallel to the touch substrate based on the light flux of the received target light beam. After determining the plane position coordinates of the floating touch point, the lens positioning structure 2 may adjust the focal length of the target lens unit having the plane position coordinates in the plurality of lens units, so as to enable the floating touch point to be located at the focus of the target lens unit, and enable the light flux received by the optical sensor unit 10 corresponding to the target lens unit to reach the threshold, thereby to determine the target focal length acquired when the light flux received by the optical sensor unit 10 reaches the threshold as the space position coordinate of the floating touch point in the normal direction of the touch substrate.

When the touch substrate is driven by the driving method in the embodiments of the present disclosure and the floating touch point is generated at a side of the lens positioning structure 2 away from the optical sensor structure 1, the optical sensor structure 1 may determine the plane position coordinates of the floating touch point in the direction parallel to the touch substrate based on the light flux received by each optical sensor unit 10. After determining the plane position coordinates of the floating touch point, the lens positioning structure 2 may adjust the focal length of the target lens unit having the plane position coordinates in the plurality of lens units, so as to enable the floating touch point to coincide with the focus of the target lens unit and enable the light flux received by the optical sensor unit 10 corresponding to the target lens unit to reach the threshold, thereby to determine the target focal length acquired when the light flux received by the corresponding optical sensor unit reaches the threshold as the space position coordinate of the floating touch point in the normal direction of the touch substrate. As a result, it is able to determine the coordinates of the floating touch point in the 3D space, thereby to achieve the 3D touch function.

In some embodiments of the present disclosure, when the lens positioning structure 2 includes the circuit control layer 27 arranged between the first substrate 20 and the second substrate 21, the adjusting, by the lens positioning structure 2, the focal length of the target lens unit having the plane position coordinates in the plurality of lens units of the lens positioning structure to enable the light flux received by the optical sensor unit 10 corresponding to the target lens unit to reach the threshold may include: enabling, by the control unit corresponding to the target lens unit, the first data line Data 1 corresponding to the target lens unit to be electrically connected to the corresponding first electrode pattern 25 under the control of the first scanning line Gate, and applying a positive electric signal to the corresponding first electrode pattern 25 through the first data line Data 1; enabling, by the control unit corresponding to the target lens unit, the second data line Data 2 corresponding to the target lens unit to be electrically connected to the second electrode pattern 26 under the control of the corresponding first scanning line Gate, and applying a negative electric signal to the corresponding second electrode pattern 26 through the second data line Data 2, so as to generate a controllable electric field between the first electrode pattern 25 and the second electrode pattern 26 corresponding to the target lens unit; and controlling the transparent elastic sphere 24 corresponding to the target lens unit to be deformed under the control of the controllable electric field, so as to change the focal length of the target lens unit formed by the transparent elastic sphere 24, thereby to enable the light flux received by the optical sensor unit 10 corresponding to the target lens unit to reach the threshold.

To be specific, after determining the plane position coordinates of the floating touch point, the target lens unit having the plane position coordinates may be determined, and then the control unit corresponding to the target lens unit may, under the control of the first scanning line Gate corresponding to the target lens unit, enable the first data line Data 1 corresponding to the target lens unit to be electrically connected to the first electrode pattern 25, and apply the positive electric signal to the corresponding first electrode pattern 25 through the first data line Data 1. In addition, the control unit corresponding to the target lens unit may, under the control of the first scanning line corresponding to the target lens unit, enable the second data line Data 2 corresponding to the target lens unit to be electrically connected to the second electrode pattern 26, and apply the negative electric signal to the corresponding second electrode pattern 26 through the second data line Data 2. At this time, the controllable electric field may be generated between the first electrode pattern 25 and the second electrode pattern 26 corresponding to the target lens unit. Under the effect of the controllable electric field, the positively-charged particles 242 in the transparent elastic sphere 24 may move close to the electrode pattern where the negative electric signal is applied, and the negatively-charged particles 243 may move close to the electrode pattern to which the positive electric signal is applied, i.e., the positively-charged particles 242 and the negatively-charged particles 243 may move toward opposite ends, so as to enable the transparent elastic sphere 24 to be deformed, thereby to change a curvature of the transparent elastic sphere 24. At this time, the focal length of the target lens unit formed by the transparent elastic sphere 24 may be changed too, and the light flux received by the optical sensor unit 10 corresponding to the target lens unit may reach the threshold, i.e., the floating touch point may coincide with the focus of the target lens unit. Hence, it is able to determine space position coordinate of the floating touch point.

When the touch substrate is driven by the driving method in the embodiments of the present disclosure, the controllable electric field may be generated between the first electrode pattern 25 and the second electrode pattern 26 corresponding to the target lens unit. Under the effect of the controllable electric field, it is able to adjust the focal length of the target lens unit and enable the floating touch point to coincide with the focus of the target lens unit, thereby to accurately determine the space position coordinates of the floating touch point.

In some embodiments of the present disclosure, when the optical sensor structure 1 further includes the processing unit, the plurality of second scanning lines and the plurality of light flux signal transmission lines, the controlling, by the optical sensor structure 1, the plurality of optical sensor units 10 of the optical sensor structure to be enabled and determining the plane position coordinates of the floating touch point in the direction parallel to the touch substrate based on the light flux received by each optical sensor unit 10 may include: inputting, by the processing unit, a scanning signal to the plurality of second scanning lines one by one so as to enable the rows of optical sensor units 10 to be enabled progressively, and transmitting, by each optical sensor unit 10, the received light flux in the form of a signal to the processing unit through the corresponding light flux signal transmission line when it has been enabled; and determining, by the processing unit, the plane position coordinates of the floating touch point in a direction parallel to the touch substrate based on the light flux signals received through the plurality of light flux signal transmission lines.

To be specific, the processing unit may transmit the scanning signal to the plurality of second scanning lines one by one, so as to enable the rows of optical sensor units 10 progressively. Each optical sensor unit 10, after being enabled, may transmit the received light flux in the form of a signal to the processing unit via the corresponding light flux signal transmission line. Because the light flux of the target light beam received by the optical sensor unit 10 corresponding to the floating touch point is greater than the light flux of the target light beam received by the other optical sensor units 10 when the target light beam is generated at the floating touch point, the processing unit may determine the optical sensor unit 10 corresponding to the floating touch point based on the size of the light flux received through each light flux signal transmission line. The plane position coordinates of each optical sensor unit 10 of the optical sensor structure may be set in advance, so it is able to determine the plane position coordinates of the floating touch point based on the plane position coordinates of the optical sensor unit 10 corresponding to the flowing touch point in the direction parallel to the touch substrate.

When the touch substrate is driven by the driving method in the embodiments of the present disclosure, the optical sensor structure 1 may acquire the light flux received by each optical sensor unit 10 in a progressive scanning manner, and determine the optical sensor unit 10 corresponding to the floating touch point based on the light flux received by each optical sensor unit, so as to accurately acquire the plane position coordinates of the floating touch point.

The present disclosure further provides in some embodiments a manufacturing method for the above-mentioned touch substrate, which includes: forming the optical sensor structure 1, the optical sensor structure 1 including the plurality of optical sensor units 10 arranged in an array form and each configured to receive a target light beam having a specific wavelength and convert the received target light beam into an electric signal, the optical sensor structure 1 being configured to determine the plane position coordinates of the floating touch point in the direction parallel to the touch substrate based on the light flux received by each optical sensor unit 10, the floating touch point being located at a side of the lens positioning structure 2 away from the optical sensor structure 1 and capable of emitting the target light beam; forming the parallel light detection structure 3 on the optical sensor structure 1, the parallel light detection structure 3 including the plurality of parallel light detection units 30, the parallel light detection units 30 being arranged in an array form and corresponding to the optical sensor units 10 in a one-to-one manner, an orthogonal projection of each parallel light detection unit onto the optical sensor structure overlapping the corresponding optical sensor unit 10, and each parallel light detection unit being configured in such a manner as to enable a light flux of parallel light beams exiting a lens positioning structure to be greater than a light flux of non-parallel light beams exiting the lens positioning structure 2; and forming the lens positioning structure 2 at a side of the parallel light detection structure 3 away from the optical sensor structure 1, the lens positioning structure 2 including the plurality of lens units each with a variable focal length, the lens units being arranged in an array form and corresponding to the optical sensor units 10 in a one-to-one manner, an orthogonal projection of each lens unit onto the optical sensor structure at least partially overlapping the corresponding optical sensor unit 10, the lens positioning structure 2 being configured to adjust the focal length of the target lens unit i having the plane position coordinates n the plurality of lens units so as to enable the light flux received by the optical sensor unit 10 corresponding to the target lens unit to reach the threshold, and determine the target focal length acquired when the light flux received by the optical sensor unit 10 reaches the threshold as the space position coordinate of the floating touch point in the normal direction of the touch substrate. When the target light beam reaching the optical sensor unit 10 is parallel to the normal direction of the touch substrate, the light flux received by the optical sensor unit 10 corresponding to the target lens unit may reach the threshold.

To be specific, during the formation of the optical sensor structure 1, each optical sensor unit 10 may be an IR sensor unit, and the target light beam capable of being received by the IR sensor unit and having the specific wavelength may be an IR beam. In addition, the IR unit is capable of feeding back a size of the light flux of the received IR beam. After the formation of the optical sensor structure 1, the lens positioning structure 2 may be formed at a side of the optical sensor structure 1 where the target light beam is capable of being received by the optical sensor unit 10. The lens positioning structure 2 may include a plurality of lens units each with a variable focal length. The lens units may correspond to the optical sensor units 10 in a one-to-one manner, and an orthogonal projection of each lens unit onto the optical sensor structure 1 may at least partially overlap the corresponding optical sensor unit 10.

In actual use, the floating touch point may be generated at a side of the lens positioning structure 2 away from the optical sensor structure 1, and the target light beam may be generated at the floating touch point and pass through the lens positioning structure 2 and the parallel light detection structure 3 toward the optical sensor structure 1. The optical sensor structure 1 may determine the plane position coordinates of the floating touch point in the direction parallel to the touch substrate based on the light flux of the target light beam received by each optical sensor unit 10. The lens positioning structure 2 may adjust the focal length of the target lens unit having the plane position coordinates in the plurality of lens units, so as to enable the floating touch point to be located at the focus of the target lens unit, and enable the light flux received by the optical sensor unit 10 corresponding to the target lens unit to reach the threshold, thereby to determine the target focal length acquired when the light flux received by the optical sensor unit 10 reaches the threshold as the space position coordinate of the floating touch point in the normal direction of the touch substrate.

The touch substrate manufactured by the manufacturing method in the embodiments may include the optical sensor structure 1 and the lens positioning structure 2 laminated one on another. The optical sensor structure 1 may include the optical sensor units 10 corresponding to the lens units each with a variable focal length of the lens position structure 2 in a one-to-one manner. When the floating touch point is generated at a side of the lens positioning structure 2 away from the optical sensor structure 1, the optical sensor structure 1 may determine the plane position coordinates of the floating touch point in the direction parallel to the touch substrate based on the light flux received by each optical sensor unit 10. After the determination of the plane position coordinates of the floating touch point, the lens position structure 2 may adjust the focal length of the target lens unit having the plane position coordinates in the plurality of lens units, so as to enable the floating touch point to coincide with a focus of target lens unit, thereby to enable the light flux received by the optical sensor unit 10 corresponding to the target lens unit to reach the threshold. Then, the space position coordinate of the floating touch pint in the normal direction of the touch substrate may be determined to be the target focal length acquired when the light flux received by the optical sensor unit 10 reaches the threshold. As a result, it is able to determine the coordinates of the floating touch point in a 3D space, thereby to achieve a 3D touch function.

In addition, the parallel light detection structure 3 may be arranged between the optical sensor structure 1 and the lens positioning structure 2 and include the parallel light detection units 30 corresponding to the optical sensor units 10 in a one-to-one manner, and the orthogonal projection of each parallel light detection unit 30 onto the optical sensor structure 1 may overlap the corresponding optical sensor unit 10, so the target light beam from the lens positioning structure 2 needs to pass through the parallel light detection unit 30 and then reach the corresponding optical sensor unit 10. Moreover, each parallel light detection unit 30 is configured in such a manner as to enable the light flux of the parallel light beams from the lens positioning structure 2 to be greater than the light flux of the non-parallel light beams from the lens positioning structure 2, so during the adjustment of the focal length of the target lens unit to adjust the floating touch point to the focus of the target lens unit, it is able to transmit the parallel light beams to the optical sensor unit 10 through the corresponding parallel light detection unit 30 in a better manner, and limit the transmission of the non-parallel light beams to the corresponding optical sensor unit 10 to some extent. When the space position coordinate of the floating touch point is determined through adjusting the focal length of the target lens unit, the light beams received by the corresponding optical sensor unit 10 are substantially parallel light beams, so as to prevent the non-parallel light beams transmitted to the optical sensor unit 10 from interfering with the measurement of the light flux. When the light flux received by the optical sensor unit 10 corresponding to the target lens unit reaches the threshold, it is able to determine that the target light beams from the target lens unit are all parallel light beams, i.e., the floating touch point is located at the focus of the target lens unit.

Hence, according to the touch substrate manufactured by the manufacturing method in the embodiments of the present disclosure, through providing the parallel light detection structure 3 between the optical sensor structure 1 and the lens positioning structure 2, it is able to accurately determine whether the floating touch point is at the focus of the target lens unit, thereby to accurately determine the space position coordinate of the floating touch point.

Further, the forming the parallel light detection structure 3 may include: providing a body; and forming a plurality of slit groups corresponding to the optical sensor units 10 in a one-to-one manner, each slit group including at least two slits, and each slit penetrating through the body in a normal direction of the touch substrate.

To be specific, the body having a predetermined thickness may be formed at first. The body may be made of various materials. For example, it may be made of a non-transparent resin material, e.g., a material commonly used for a black matrix of the display substrate. Then, the slits penetrating the body may be formed in the normal direction of the touch substrate through etching, 3D printing, exposing or developing. A ratio of an aperture size of each slit to a thickness of the body in the normal direction of the touch substrate shall be as small as possible. In a possible embodiment of the present disclosure, the ratio may be smaller than 1/1000. In addition, the aperture size of each slit may be at a nanometer level or a micrometer level.

Each parallel light detection unit 30 of the parallel light detection structure 3 may be of a cellular structure and each slit in the cellular structure may be at a nanometer or micrometer level. In this regard, it is able to facilitate the transmission of the parallel light beams through the parallel light detection unit 30 and stop the non-parallel light beams from passing therethrough, thereby to accurately determine the space position coordinate of the floating touch point.

In some embodiments of the present disclosure, the forming the lens positioning structure may include: providing the first substrate 20 and the second substrate 21; forming the plurality of barrier patterns 22 on the first substrate 20, the plurality of barrier patterns 22 being configured to define a plurality of accommodation cavities on the first substrate 20; forming the first electrode pattern 25 and the second electrode pattern 26 within each accommodation cavity, the first electrode pattern and the second electrode pattern being arranged opposite to each other; placing the transparent elastic sphere 24 into each accommodation cavity, and filling each accommodation cavity with a first transparent insulating liquid 23, the transparent elastic sphere 24 being arranged between the first electrode pattern 25 and the second electrode pattern 26 and including the transparent thin film, and the second transparent insulating liquid 241, the positively-charged particles 242 and the negatively-charged particles 243 encapsulated by the transparent thin film, and the first transparent insulating liquid 23 having a refractive index smaller than the transparent elastic sphere 24; enabling the first substrate 20 and the second substrate 21 to be opposite to each other to form a cell, so as to enable each accommodation cavity on the first substrate 20 to form a sealing cavity; and applying electric signals to the first electrode pattern 25 and the second electrode pattern 26, so as to enable the transparent elastic sphere 24 in the corresponding sealing cavity to be deformed, thereby to change a focal length of the lens unit formed by the transparent elastic sphere 24.

To be specific, the first substrate 20 and the second substrate 21 may each be a glass substrate. During the formation of the barrier patterns 22, an insulating film layer may be made of an insulating material, e.g., a resin material, and formed on the first substrate 20. Next, the insulating film layer may be patterned to form the plurality of barrier patterns 22 for defining the plurality of accommodation cavities on the first substrate 20, and the plurality of accommodation cavities may be insulated from each other. Next, the first electrode pattern 25 and the second electrode pattern 26 opposite to each other may be formed in each accommodation cavity. To be specific, a conductive film layer having a desired thickness and made of ITO or a non-transparent metallic material, e.g., Cu or Ag, may be formed in each accommodation cavity through sputtering for many times or one time, and then the conductive film layer may be patterned to form the first electrode pattern 25 and the second electrode pattern 26 arranged opposite to each other. It should be appreciated that, the conductive film layer may be patterned in various modes. For example, a photoresist may be applied onto the conductive film layer, and then exposed, developed and etched so as to pattern the conductive film layer. In addition, a thickness of each of the first electrode pattern 25 and the second electrode pattern 26 in a direction perpendicular to the first substrate 20 may be 0 μm to 50 μm.

After the formation of the first electrode pattern 25 and the second electrode pattern 26, the transparent elastic sphere 24 may be placed into each accommodation cavity, and the first transparent insulating liquid 23 may be filled into each accommodation cavity. The transparent elastic sphere 24 may be arranged between the first electrode pattern 25 and the second electrode pattern 26. It should be appreciated that, an order of placing the transparent elastic sphere 24 and filling the first transparent insulating liquid 23 in each accommodation cavity may be adjusted according to the practical need, and the transparent elastic sphere 24 may be formed separately and then placed into the accommodation cavity. In addition, the accommodation cavities defined by the plurality of barrier patterns 22 may be insulated from each other, so as to prevent the electrodes or the transparent elastic spheres 24 in the adjacent cavities from being short-circuited, thereby to provide the lens positioning structure 2 with stable working performance.

The first transparent insulating liquid 23 may be a transparent dielectric material, e.g., pure water or nonpolar oil, e.g., silicone oil. The second transparent insulating liquid 241 may be a nonpolar liquid having a refractive index of 1 to 3, e.g., dimethicone, or an insulation medium for dispersing charged particles, e.g., nonpolar alkane, cycloalkane, arene, tetrachloroethylene or tetrachloromethane having a density similar to the charged particles, or a mixture of thereof in different ratios and having a similar density.

The positively-charged particles 242 and the negatively-charged particles 243 in the transparent elastic sphere 24 may be transparent or non-transparent. In a possible embodiment of the present disclosure, the positively-charged particles 242 and the negatively-charged particles 243 may be charged electrophoretic particles or electronic ink. The electrophoretic particle may be a charged particle acquired using a high-molecular polymer, e.g., polyvinyl benzene or polyethylene, as a host material, or a charged particle acquired using titanium dioxide as a host material. Currently, the charged electrophoretic particle has a minimum size of 50 nm to 100 nm and a maximum size of up to 50 µm, and the electronic ink particle has a minimum size of 1 µm to 2 µm. It should be appreciated that, the sizes of the positively-charged particles 242 and the negatively-charged particles 243 may be selected according to the practical need, and the quantities of the positively-charged particles 242 and the negatively-charged particles 243 in the transparent elastic sphere 24 may be set according to the practical need. When the positively-charged particles 242 and the negatively-charged particles 243 each has a relatively large size, the quantities of the positively-charged particles 242 and the negatively-charged particles 243 may be reduced correspondingly, and when the positively-charged particles 242 and the negatively-charged particles 243 each has a relatively small size, the quantities of the positively-charged particles 242 and the negatively-charged particles 243 may be increased correspondingly. In addition, the transparent elastic sphere 24 may also be directly formed as a large-size electrophoretic sphere or an electronic ink microcapsule, and a manufacture process thereof is similar to that known in the art.

In a possible embodiment of the present disclosure, the transparent thin film of the transparent elastic sphere 24 may be an organic transparent insulating thin film, e.g., a polyimide (PI) thin film, a polyester thin film or a polyolefin thin film, or an elastic transparent polymer thin film.

After placing the transparent elastic sphere 24 and filling the first transparent insulating liquid 23 into each accommodation cavity, the first substrate 20 may be arranged opposite to the second substrate 21 to form a cell, so as to enable each accommodation cavity on the first substrate 20 to be a sealing cavity. It should be appreciated that, a peripheral region between the first substrate 20 and the second substrate 21 may be sealed with a sealant 29.

In the lens positioning structure 2 manufactured by the manufacturing method in the embodiments of the present disclosure, the electric signals may be applied to the first electrode pattern 25 and the second electrode pattern 26 corresponding to the lens unit, so as to generate the controllable electric field between the first electrode pattern 25 and the second electrode pattern 26. Under the effect of the controllable electric field, the transparent elastic sphere 24 in each sealing cavity may be deformed, so as to change the focal length of the lens unit formed by the transparent elastic sphere 24 and enable the floating touch point to coincide with the focus of the target lens unit, thereby to accurately determine the space position coordinate of the floating touch point.

In some embodiments of the present disclosure, the forming the lens positioning structure 2 may further include, prior to forming the plurality of barrier patterns 22, forming the circuit control layer 27 on the first substrate 20. The circuit control layer 27 may include a plurality of first scanning lines Gate, a plurality of groups of data lines Data, and a plurality of control units. The plurality of control units may correspond to the plurality of sealing cavities in a one-to-one manner, and each control unit may be connected to the first electrode pattern 25 and the second electrode pattern 26 in the corresponding sealing cavity. The plurality of control units may be arranged in rows and columns, the plurality of first scanning lines Gate may correspond to the rows of control units in a one-to-one manner, and each first scanning line Gate may be connected to the control units in the corresponding row. The plurality of groups of data lines Data may correspond to the columns of the control units in a one-to-one manner, each group of data lines Data may include a first data line Data 1 and a second data line Data 2 insulated from each other, the first data line Data 1 may be connected to the control units in the corresponding column, and the second data line Data 2 may be connected to the control units in the corresponding column. Each control unit is configured to, under the control of the corresponding first scanning line Gate, control the corresponding first data line Data 1 to be electrically connected to, or electrically disconnected from, the corresponding first electrode pattern 25, and control the corresponding second data line Data 2 to be electrically connected to, or electrically disconnected from, the corresponding second electrode pattern 26.

To be specific, prior to forming the plurality of barrier patterns 22, the circuit control layer 27 may be formed on the first substrate 20. The circuit control layer 27 may include the plurality of first scanning lines Gate, the plurality of groups of data lines and the plurality of control units. The first scanning lines Gate may cross, and may be insulated from, the data lines. The plurality of control units may be arranged in rows and columns, the plurality of first scanning lines Gate may correspond to the rows of control units in a one-to-one manner, and each first scanning line Gate may be connected to the control units in the corresponding row. The plurality of groups of data lines may correspond to the columns of control units in a one-to-one manner, and each group of data lines may include the first data line Data 1 and the second data line Data 2 insulated from each other. The first data line Data 1 may be connected to the control units in the corresponding column, and the second data line Data 2 may be connected to the control units in the corresponding column. After the formation of the circuit control layer 27, the structures such as the barrier patterns 22 may be formed at a side of the circuit control layer 27 away from the first substrate 20. During the formation of the first electrode pattern 25 and the second electrode pattern 26, each control unit may be connected to the first electrode pattern 25 and the second electrode pattern 26 in the corresponding sealing cavity. It should be appreciated that, during the formation of the barrier patterns 22, parts of the barrier patterns 22 may be formed at surfaces of the first scanning lines Gate.

Further, each control unit may include a first transistor and a second transistor. A gate electrode of the first transmission may be connected to the corresponding first scanning line Gate, a first electrode of the first transistor may be connected to a corresponding first data line Data 1, and a second electrode of the first transistor may be connected to the corresponding first electrode pattern 25. A gate electrode of the second transistor may be connected to a corresponding first scanning line Gate, a first electrode of the second transistor may be connected to a corresponding second data line Data 2, and a second electrode of the second transistor may be connected to the corresponding second electrode pattern 26. The first transistor and the second transistor may each function as a switching transistor, and under the control of the corresponding first scanning line Gate, the first electrode and the second electrode of each of the first transistor and the second transistor may be electrically connected to each other, so as to enable the first data line Data 1 to be electrically connected to the corresponding first electrode pattern 25 and enable the second data line Data 2 to be electrically connected to the corresponding second electrode pattern 26.

It should be appreciated that, the circuit control layer 27 may not be limited to be formed on the first substrate 20, and instead, it may also be formed on the second substrate 21, as long as the above connection relationship is met.

An operating procedure of the manufactured circuit control layer 27 will be described hereinafter.

After determining the plane position coordinates of the floating touch point, the target lens unit having the plane position coordinates may be determined, and then the control unit corresponding to the target lens unit may, under the control of the first scanning line Gate corresponding to the target lens unit, enable the first data line Data 1 corresponding to the target lens unit to be electrically connected to the first electrode pattern 25, and apply the positive electric signal to the corresponding first electrode pattern 25 through the first data line Data 1. In addition, the control unit corresponding to the target lens unit may, under the control of the first scanning line corresponding to the target lens unit, enable the second data line Data 2 corresponding to the target lens unit to be electrically connected to the second electrode pattern 26, and apply the negative electric signal to the corresponding second electrode pattern 26 through the second data line Data 2. At this time, the controllable electric field may be generated between the first electrode pattern 25 and the second electrode pattern 26 corresponding to the target lens unit. Under the effect of the controllable electric field, the transparent elastic sphere 24 corresponding to the target lens unit may be deformed, so as to change the focal length of the target lens unit formed by the transparent elastic sphere 24 and enable the floating touch point to coincide with the focus of the target lens unit, thereby to determine the space position coordinate of the floating touch point.

Through the manufacture circuit control layer 27, it is able to separately adjust the focal length of any lens unit of the lens positioning structure 2.

In some embodiments of the present disclosure, the forming the lens positioning structure may further include, prior to enabling the second substrate 21 and the first substrate 20 to be opposite to each other to form a cell, forming the light-shielding pattern 28 on the second substrate 21. The light-shielding pattern 28 may be provided with a plurality of openings corresponding to the plurality of optical sensor units 10 in a one-to-one manner. Subsequent to enabling the second substrate 21 and the first substrate 20 to be opposite to each other to form a cell, the light-shielding pattern 28 may be arranged between the first substrate 20 and the second substrate 21, and an orthogonal projection of each opening onto the optical sensor structure 1 may coincide with the corresponding optical sensor unit 10.

To be specific, a light-shielding film layer may be made of a non-transparent resin material and formed on the second substrate 21, and then exposed through a mask so as to form a light-shielding pattern reserved region corresponding to the openings and a light-shielding pattern unreserved region corresponding to a region other than the region where the openings are formed. Next, the exposed light-shielding film layer may be developed using a developing agent, so as to form the light-shielding pattern 28. Subsequent to enabling the second substrate 21 and the first substrate 20 to be opposite to each other to form a cell, the light-shielding pattern 28 may be arranged between the first substrate 20 and the second substrate 21, and the orthogonal projection of each opening onto the optical sensor structure 1 may coincide with the corresponding optical sensor unit 10.

It should be appreciated that, apart from the above structure, the light-shielding pattern 28 may further include a first sub-pattern and/or a second sub-pattern. The first sub-pattern may be arranged at a surface of the first substrate 20 facing the second substrate 21 and provided with a plurality of openings corresponding to the optical sensor units in a one-to-one manner, and an orthogonal projection of each opening onto the optical sensor structure 1 may coincide with the corresponding optical sensor unit 10. The second sub-pattern may be arranged at a surface of the second substrate 21 facing the first substrate 20 and provided with a plurality of openings corresponding to the optical sensor units in a one-to-one manner, and an orthogonal projection of each opening onto the optical sensor structure 1 may coincide with the corresponding optical sensor unit 10.

After the formation of the light-shielding pattern 28, the light-shielding pattern 28 may be used to not only shield the barrier patterns 22 between the first substrate 20 and the second substrate 21, the first electrode patterns 25, the second electrode patterns 26, the circuit control layer 27 and/or the positively-charged particles 242 and the negatively-charged particles 243 in the transparent elastic sphere 24, but also enable the target light beam generated at the floating touch point to pass through the opening in the light-shielding pattern 28 toward the lens unit, and/or enable the target light beam from the lens unit to pass through the opening in the light-shielding pattern 28 toward the corresponding optical sensor unit 10, thereby to ensure the stable working performance of the lens positioning structure 2.

In some embodiments of the present disclosure, the forming the optical sensor structure 1 may include: providing a substrate; forming a plurality of second scanning lines and a plurality of light flux signal transmission lines on the substrate, the plurality of optical sensor units 10 being arranged in rows and columns, the plurality of second scanning lines corresponding to the rows of optical sensor units 10 in a one-to-one manner, each second scanning line being connected to the optical sensor units 10 in the corresponding row, the plurality of light flux signal transmission lines corresponding to the columns of the optical sensor units in a one-to-one manner, and each light flux signal transmission line being connected to the optical sensor units 10 in the corresponding column; and forming a processing unit at a peripheral region of the substrate, the processing unit being connected to the plurality of second scanning lines and the plurality of light flux signal transmission lines. Each optical sensor unit 10 is configured to be enabled under the control of the corresponding second scanning line, and transmit the received light flux in the form of a signal to the processing unit via the corresponding light flux signal transmission line. The processing unit is configured to input a scanning signal to the plurality of second scanning lines, and determine the plane position coordinates of the floating touch point in the direction parallel to the touch substrate based on light flux signals received via the plurality of light flux signal transmission lines.

To be specific, the substrate may be a glass substrate. The second scanning lines, the light flux signal transmission lines and the optical sensor units 10 may be formed on the glass substrate. The second scanning lines may cross, and may be insulated from, the light flux signal transmission lines, and the optical sensor units 10 may be arranged in rows and columns. The plurality of second scanning lines may correspond to the rows of optical sensor units 10 in a one-to-one manner, and each second scanning line may be connected to the optical sensor units 10 in the corresponding row. The plurality of light flux signal transmission lines may correspond to the columns of optical sensor units 10 in a one-to-one manner, and each light flux signal transmission line may be connected to the optical sensor units 10 in the corresponding column. Then, a driving IC may be selected as the processing unit and bound to the peripheral region of the substrate in such a manner that the driving IC is connected to the plurality of second scanning lines and the plurality of light flux signal transmission lines.

An operating procedure of the manufacture optical sensor structure 1 will be described as follows.

The processing unit may transmit the scanning signal to the plurality of second scanning lines one by one, so as to enable the rows of optical sensor units 10 progressively. Each optical sensor unit 10, after being enabled, may transmit the received light flux in the form of a signal to the processing unit via the corresponding light flux signal transmission line. Because the light flux of the target light beam received by the optical sensor unit 10 corresponding to the floating touch point is greater than the light flux of the target light beam received by the other optical sensor units 10 when the target light beam is generated at the floating touch point, the processing unit may determine the optical sensor unit 10 corresponding to the floating touch point based on the size of the light flux received through each light flux signal transmission line. The plane position coordinates of each optical sensor unit 10 of the optical sensor structure may be set in advance, so it is able to determine the plane position coordinates of the floating touch point based on the plane position coordinates of the optical sensor unit 10 corresponding to the flowing touch point in the direction parallel to the touch substrate.

The manufactured optical sensor structure 1 may accurately acquire the light flux received by each optical sensor unit 10 in a progressive manner and determine the optical sensor unit 10 corresponding to the floating touch point, thereby to acquire the plane position coordinates of the floating touch point.

It should be appreciated that, the above embodiments have been described in a progressive manner, and the same or similar contents in the embodiments will not be repeated, i.e., each embodiment merely focuses on the difference from the others. Especially, the method embodiments are substantially similar to the product embodiments, so they have been described in a brief manner and the implementation thereof may refer to that in the product embodiments.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the embodiments of the present disclosure, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch substrate, comprising:
   an optical sensor structure comprising a plurality of optical sensor units arranged in an array form and each configured to receive a target light beam having a specific wavelength and convert the received target light beam into an electric signal;
   a lens positioning structure laminated on the optical sensor structure and comprising a plurality of lens units each with a variable focal length, the plurality of lens units being arranged in an array form and corresponding to the plurality of optical sensor units in a one-to-one manner, an orthogonal projection of each lens unit onto the optical sensor structure at least partially overlapping the corresponding optical sensor unit; and
   a parallel light detection structure arranged between the optical sensor structure and the lens positioning structure and comprising a plurality of parallel light detection units arranged in an array form and corresponding to the plurality of optical sensor units in a one-to-one manner, an orthogonal projection of each parallel light detection unit onto the optical sensor structure overlapping the corresponding optical sensor unit, and each parallel light detection unit being configured in such a manner as to enable a light flux of parallel light beams exiting from the lens positioning structure to be greater than a light flux of non-parallel light beams exiting from the lens positioning structure.

2. The touch substrate according to claim 1, wherein the parallel light detection structure comprises a body and a plurality of slits penetrating through the body in a normal direction of the touch substrate.

3. The touch substrate according to claim 1, wherein the lens positioning structure comprises:
   a first substrate and a second substrate arranged opposite to each other;
   a plurality of barrier patterns arranged between the first substrate and the second substrate and configured to define a plurality of sealing cavities between the first substrate and the second substrate;

a first transparent insulating liquid and a transparent elastic sphere arranged in each sealing cavity, the transparent elastic sphere comprising a transparent thin film, and a second transparent insulating liquid, positively-charged particles and negatively-charged particles encapsulated by the transparent thin film, a refractive index of the first transparent insulating liquid being smaller than a refractive index of the transparent elastic sphere; and a first electrode pattern and a second electrode pattern arranged within each sealing cavity and opposite to each other, the transparent elastic sphere being located between the first electrode pattern and the second electrode pattern, and the electric signals being applied to the first electrode pattern and the second electrode pattern so that the transparent elastic sphere in each sealing cavity is deformed, a focal length of the lens unit formed by the transparent elastic sphere is changed.

4. The touch substrate according to claim 3, wherein the lens positioning structure further comprises a circuit control layer arranged between the first substrate and the second substrate and comprising a plurality of first scanning lines, a plurality of groups of data lines, and a plurality of control units;

the plurality of control units corresponds to the plurality of sealing cavities in a one-to-one manner, and each control unit is connected to the first electrode pattern and the second electrode pattern in the corresponding sealing cavity;

the plurality of control units is arranged in rows and columns, the plurality of first scanning lines corresponds to the rows of control units in a one-to-one manner, and each first scanning line is connected to the control units in the corresponding row;

the plurality of groups of data lines corresponds to the columns of the control units in a one-to-one manner, each group of data lines comprise a first data line and a second data line insulated from each other, the first data line is connected to the control units in the corresponding column, and the second data line is connected to the control units in the corresponding column; and each control unit is configured to, under the control of the corresponding first scanning line, control the corresponding first data line to be electrically connected to, or electrically disconnected from, the corresponding first electrode pattern, and control the corresponding second data line to be electrically connected to, or electrically disconnected from, the corresponding second electrode pattern.

5. The touch substrate according to claim 4, wherein the lens positioning structure further comprises a light-shielding pattern arranged between the first substrate and the second substrate and provided with a plurality of openings corresponding to the plurality of optical sensor units in a one-to-one manner, and an orthogonal projection of each opening onto the optical sensor structure coincides with the corresponding optical sensor unit.

6. The touch substrate according to claim 1, wherein the optical sensor structure further comprises a processing unit, a plurality of second scanning lines and a plurality of light flux signal transmission lines;

the processing unit is connected to the plurality of second scanning lines and the plurality of light flux signal transmission lines, and configured to input a scanning signal to the plurality of second scanning lines, and determine plane position coordinates of a floating touch point in a direction parallel to the touch substrate based on light flux signals received via the plurality of light flux signal transmission lines;

the plurality of optical sensor units is arranged in rows and columns, the plurality of second scanning lines corresponds to the rows of optical sensor units in a one-to-one manner, each second scanning line is connected to the optical sensor units in a corresponding row, the plurality of light flux signal transmission lines corresponds to the columns of optical sensor units in a one-to-one manner, and each light flux signal transmission line is connected to the optical sensor units in a corresponding column; and each optical sensor unit is configured to be enabled under the control of the corresponding second scanning line, and transmit the received light flux in the form of a signal to the processing unit via the corresponding light flux signal transmission line.

7. A touch assembly, comprising the touch substrate according to claim 1, and a floating touch member configured to emit a target light beam having a specific wavelength, and generate a floating touch point at a side of the lens positioning structure away from the optical sensor structure.

8. A touch display device, comprising the touch assembly according to claim 7, and a display substrate laminated on the touch substrate.

9. A driving method for the touch substrate according to claim 1, comprising:

controlling, by an optical sensor structure, a plurality of optical sensor units of the optical sensor structure to be enabled, and determining plane position coordinates of a floating touch point in a direction parallel to the touch substrate based on a light flux received by each optical sensor unit; and adjusting, by a lens positioning structure, a focal length of a target lens unit having the plane position coordinates in a plurality of lens units of the lens positioning structure to enable the light flux received by the optical sensor unit corresponding to the target lens unit to reach a threshold, and determining a target focal length acquired when the light flux received by the optical sensor unit reaches the threshold as a space position coordinate of the floating touch point in a normal direction of the touch substrate, wherein when a light beam reaching the optical sensor unit is parallel to the normal direction of the touch substrate, the light flux received by the optical sensor unit corresponding to the target lens unit reaches the threshold.

10. The driving method according to claim 9, wherein when the lens positioning structure comprises a circuit control layer arranged between a first substrate and a second substrate, the adjusting, by the lens positioning structure, the focal length of the target lens unit having the plane position coordinates in the plurality of lens units of the lens positioning structure to enable the light flux received by the optical sensor unit corresponding to the target lens unit to reach the threshold comprises:

enabling, by a control unit corresponding to the target lens unit, a first data line corresponding to the target lens unit to be electrically connected to a corresponding first electrode pattern under the control of a first scanning line, and applying a positive electric signal to the corresponding first electrode pattern through the first data line;

enabling, by the control unit corresponding to the target lens unit, a second data line corresponding to the target lens unit to be electrically connected to a second electrode pattern under the control of the corresponding first scanning line, and applying a negative electric signal to the corresponding second electrode pattern through the second data line, to generate a controllable electric field between the first electrode pattern and the second electrode pattern corresponding to the target lens unit; and controlling a transparent elastic sphere corresponding to the target lens unit to be deformed under the control of the controllable electric field, to change a focal length of the target lens unit formed by the transparent elastic sphere, and to enable the light flux received by the optical sensor unit corresponding to the target lens unit to reach the threshold.

11. The driving method according to claim 9, wherein when the optical sensor structure further comprises a processing unit, a plurality of second scanning lines and a plurality of light flux signal transmission lines, the controlling, by the optical sensor structure, the plurality of optical sensor units of the optical sensor structure to be enabled and determining the plane position coordinates of the floating touch point in the direction parallel to the touch substrate based on the light flux received by each optical sensor unit comprises:

inputting, by the processing unit, a scanning signal to the plurality of second scanning lines one by one so as to enable the rows of optical sensor units to be enabled progressively, and transmitting, by each optical sensor unit, the received light flux in the form of an electric signal to the processing unit through the corresponding light flux signal transmission line when the optical sensor unit has been enabled; and determining, by the processing unit, the plane position coordinates of the floating touch point in a direction parallel to the touch substrate based on the light flux signals received through the plurality of light flux signal transmission lines.

12. A manufacturing method for the touch substrate according to claim 1, comprising:

forming an optical sensor structure, the optical sensor structure comprising a plurality of optical sensor units arranged in an array form and each configured to receive a target light beam having a specific wavelength and convert the received target light beam into an electric signal;

forming a parallel light detection structure on the optical sensor structure, the parallel light detection structure comprising a plurality of parallel light detection units arranged in an array form and corresponding to the plurality of optical sensor units in a one-to-one manner, an orthogonal projection of each parallel light detection unit onto the optical sensor structure overlapping the corresponding optical sensor unit, and each parallel light detection unit being configured in such a manner as to enable a light flux of parallel light beams exiting from a lens positioning structure to be greater than a light flux of non-parallel light beams exiting from the lens positioning structure; and forming the lens positioning structure at a side of the parallel light detection structure away from the optical sensor structure, the lens positioning structure comprising a plurality of lens units each with a variable focal length, the plurality of lens units being arranged in an array form and corresponding to the plurality of optical sensor units in a one-to-one manlier, and an orthogonal projection of each lens unit onto the optical sensor structure at least partially overlapping the corresponding optical sensor unit.

13. The manufacturing method according to claim 12, wherein the forming the parallel light detection structure comprises:

providing a body; and forming a plurality of slit groups corresponding to the plurality of optical sensor units in a one-to-one manner, each slit group comprising at least two slits, and each slit penetrating through the body in a normal direction of the touch substrate.

14. The manufacturing method according to claim 12, wherein the forming the lens positioning structure comprises:

providing a first substrate and a second substrate;

forming a plurality of barrier patterns on the first substrate, the plurality of barrier patterns being configured to define a plurality of accommodation cavities on the first substrate;

forming a first electrode pattern and a second electrode pattern within each accommodation cavity, the first electrode pattern and the second electrode pattern being arranged opposite to each other;

placing a transparent elastic sphere into each accommodation cavity, and filling each accommodation cavity with a first transparent insulating liquid, the transparent elastic sphere being arranged between the first electrode pattern and the second electrode pattern and comprising a transparent thin film, and a second transparent insulating liquid, positively-charged particles and negatively-charged particles encapsulated by the transparent thin film, and the first transparent insulating liquid having a refractive index smaller than the transparent elastic sphere;

enabling the first substrate and the second substrate to be opposite to each other to form a cell, to enable each accommodation cavity on the first substrate to form a sealing cavity; and applying electric signals to the first electrode pattern and the second electrode pattern, to enable the transparent elastic sphere in the corresponding sealing cavity to be deformed, and to change a focal length of a lens unit formed by the transparent elastic sphere.

15. The manufacturing method according to claim 14, wherein the forming the lens positioning structure further comprises:

prior to forming the plurality of barrier patterns, forming a circuit control layer on the first substrate; the circuit control layer comprises a plurality of first scanning lines, a plurality of groups of data lines, and a plurality of control units;

the plurality of control units corresponds to the plurality of sealing cavities in a one-to-one manner, and each control unit is connected to the first electrode pattern and the second electrode pattern in the corresponding sealing cavity;

the plurality of control units is arranged in rows and columns, the plurality of first scanning lines corresponds to the rows of control units in a one-to-one manner, and each first scanning line is connected to the control units in the corresponding row;

the plurality of groups of data lines corresponds to the columns of the control units in a one-to-one manner, each group of data lines comprise a first data line and a second data line insulated from each other, the first data line is connected to the control units in the corresponding column, and the second data line is connected to the control units in the corresponding column; and each control unit is configured to, under the control of the corresponding first scanning line, control the corresponding first data line to be electrically connected to, or electrically disconnected from, the corresponding first electrode pattern, and control the corresponding second data line to be electrically connected to, or electrically disconnected from, the corresponding second electrode pattern.

16. The manufacturing method according to claim 14, wherein the forming the lens positioning structure further comprises, prior to enabling the second substrate and the first substrate to be opposite to each other to form a cell, forming a light-shielding pattern on the second substrate, the light-shielding pattern being provided with a plurality of openings corresponding to the plurality of optical sensor units in a one-to-one manner, wherein subsequent to enabling the second substrate and the first substrate to be opposite to each other to form a cell, the light-shielding pattern is arranged between the first substrate and the second substrate, and an orthogonal projection of each opening onto the optical sensor structure coincides with the corresponding optical sensor unit.

17. The manufacturing method according to claim 12, wherein the forming the optical sensor structure comprises:
providing a substrate;

forming a plurality of second scanning lines and a plurality of light flux signal transmission lines on the substrate, the plurality of optical sensor units being arranged in rows and columns, the plurality of second scanning lines corresponding to the rows of optical sensor units in a one-to-one manner, each second scanning line being connected to the optical sensor units in the corresponding row, the plurality of light flux signal transmission lines corresponding to the columns of the optical sensor units in a one-to-one manner, and each light flux signal transmission line being connected to the optical sensor units in the corresponding column; and forming a processing unit at a peripheral region of the substrate, the processing unit being connected to the plurality of second scanning lines and the plurality of light flux signal transmission lines, wherein each optical sensor unit is configured to be enabled under the control of the corresponding second scanning line, and transmit the received light flux in the form of a signal to the processing unit via the corresponding light flux signal transmission line, and wherein the processing unit is configured to input a scanning signal to the plurality of second scanning lines, and determine plane position coordinates of a floating touch point in a direction parallel to the touch substrate based on light flux signals received via the plurality of light flux signal transmission lines.

* * * * *